United States Patent
Jones

(10) Patent No.: US 12,138,568 B2
(45) Date of Patent: Nov. 12, 2024

(54) CENTRIFUGAL FILTER UNIT FOR A WASHING MACHINE HAVING A REMOVABLE PORTION SHAPED TO SCRAPE AGAINST A SIDE WALL DURING ITS REMOVAL

(71) Applicant: Xeros Limited, Rotherham (GB)

(72) Inventor: Gareth Evan Lyn Jones, Bath and North East Somerset (GB)

(73) Assignee: Xeros Limited, Rotherham (GB)

( * ) Notice: Subject to any disclaimer, the term of this patent is extended or adjusted under 35 U.S.C. 154(b) by 0 days.

(21) Appl. No.: 16/956,256

(22) PCT Filed: Dec. 19, 2018

(86) PCT No.: PCT/GB2018/053677
§ 371 (c)(1),
(2) Date: Jun. 19, 2020

(87) PCT Pub. No.: WO2019/122862
PCT Pub. Date: Jun. 27, 2019

(65) Prior Publication Data
US 2020/0316501 A1     Oct. 8, 2020

(30) Foreign Application Priority Data

Dec. 19, 2017  (GB) .................................... 1721348
Nov. 30, 2018  (GB) .................................... 1819577

(51) Int. Cl.
*B01D 33/11*       (2006.01)
*A47L 15/42*       (2006.01)
(Continued)

(52) U.S. Cl.
CPC .......... *B01D 33/11* (2013.01); *A47L 15/4208* (2013.01); *B01D 33/466* (2013.01);
(Continued)

(58) Field of Classification Search
CPC .... B01D 33/11; B01D 33/466; B01D 33/722; B01D 2201/325; B01D 33/727;
(Continued)

(56) References Cited

U.S. PATENT DOCUMENTS 636,016 A  * 10/1899  Welch ................. B02C 18/0092
                                                    210/174
866,424 A  * 9/1907  Blaisdell ................... B04B 3/06
                                                    210/370

(Continued)

FOREIGN PATENT DOCUMENTS

CA          2526819 A1      5/2007
CN          2493870 Y       5/2002
(Continued)

OTHER PUBLICATIONS

U.S. Appl. No. 16/497,070, Xeros Ltd.
(Continued)

Primary Examiner — Charles Cooley
(74) Attorney, Agent, or Firm — Clark & Elbing LLP

(57) ABSTRACT

A centrifugal filter unit for an apparatus for use in the treatment of a substrate with a treatment formulation is provided. The centrifugal filter unit includes a) a housing having an outlet; b) an inlet; c) a filter rotatably mounted in the housing and having a side wall with perforations that allow liquid to pass through but prevent solid material from passing through; d) an aperture; and e) a drive for rotating the filter. A portion of the centrifugal filter unit in the filter chamber is removable and, when removed from the centrifugal filter unit following operation, takes with it at least a portion of the solid material prevented from passing through the perforations. The centrifugal filter unit is arranged such that the feed is drawn into the filter from the inlet through the aperture and the liquid is expelled through the perforations to the outlet and the solid material is (Continued)

retained in the filter. The removable portion is shaped to scrape against the side wall during removal.

15 Claims, 9 Drawing Sheets

(51) Int. Cl.
| | |
|---|---|
| *B01D 33/46* | (2006.01) |
| *B01D 33/72* | (2006.01) |
| *B04B 15/06* | (2006.01) |
| *C02F 1/00* | (2023.01) |
| *C02F 103/00* | (2006.01) |
| *D06F 33/47* | (2020.01) |
| *D06F 39/08* | (2006.01) |
| *D06F 39/10* | (2006.01) |

(52) U.S. Cl.
CPC ............ *B01D 33/722* (2013.01); *B04B 15/06* (2013.01); *C02F 1/001* (2013.01); *B01D 2201/325* (2013.01); *C02F 2103/002* (2013.01); *C02F 2307/12* (2013.01); *D06F 33/47* (2020.02); *D06F 39/085* (2013.01); *D06F 39/10* (2013.01)

(58) Field of Classification Search
CPC ................. A47L 15/4208; C02F 1/001; C02F 2103/002; C02F 2307/12; D06F 33/47; D06F 39/085; D06F 39/10; B01F 35/75
USPC .... 494/67, 81; 210/360.1–379, 360.1–380.1; 127/19, 56
See application file for complete search history.

(56) References Cited

U.S. PATENT DOCUMENTS

| | | | | |
|---|---|---|---|---|
| 983,735 | A * | 2/1911 | Lutz et al. | B04B 11/08 210/372 |
| 1,262,146 | A * | 4/1918 | Ward | B04B 3/00 210/360.2 |
| 1,292,758 | A * | 1/1919 | Gonzalez | B04B 3/06 210/376 |
| 1,510,863 | A | 10/1924 | Rose | |
| 1,603,125 | A * | 10/1926 | Lewis | B04B 1/06 494/44 |
| 1,761,593 | A * | 6/1930 | Sharples | B04B 11/04 210/772 |
| 1,767,314 | A * | 6/1930 | Schmitz | B04B 3/00 210/360.2 |
| 2,190,072 | A * | 2/1940 | Keys | F26B 5/08 134/132 |
| 2,436,218 | A * | 2/1948 | Malcolm | A23L 2/12 62/541 |
| 2,516,963 | A * | 8/1950 | Derbenwick | A23N 4/02 99/571 |
| 2,527,695 | A * | 10/1950 | Bennett | A47J 19/027 99/511 |
| 2,548,417 | A * | 4/1951 | Baxter, Jr. | D21F 1/66 210/373 |
| 2,695,133 | A * | 11/1954 | Drury | B04B 3/00 209/291 |
| 2,976,998 | A * | 3/1961 | Smith | D06F 37/24 74/572.4 |
| 2,991,887 | A * | 7/1961 | Kocher | B04B 3/06 210/376 |
| 3,049,241 | A * | 8/1962 | Ruegg | B04B 7/18 210/376 |
| 3,279,611 | A * | 10/1966 | Von Rotel | B04B 3/00 210/330 |
| 3,327,401 | A * | 6/1967 | Stamos | F26B 5/08 210/384 |
| 3,365,066 | A * | 1/1968 | Howell | B04B 15/08 210/377 |
| 3,401,800 | A * | 9/1968 | Stock | B04B 7/18 210/498 |
| 3,438,500 | A * | 4/1969 | Pico | B04B 3/025 210/370 |
| 3,504,794 | A * | 4/1970 | Tholl | B04B 11/04 210/746 |
| 3,623,613 | A * | 11/1971 | Quetsch | B04B 3/025 210/370 |
| 3,630,379 | A * | 12/1971 | Sharples | B04B 7/18 210/497.1 |
| 3,682,373 | A * | 8/1972 | Mercier | B04B 9/12 494/36 |
| 3,708,111 | A * | 1/1973 | Sheeler | B04B 5/00 494/37 |
| 3,750,885 | A | 8/1973 | Fournier | |
| 3,762,563 | A | 10/1973 | Petersen | |
| 3,827,985 | A * | 8/1974 | De Haan et al. | B01D 33/067 210/186 |
| 3,845,740 | A * | 11/1974 | Ferrara | B04B 15/12 118/52 |
| 3,864,256 | A * | 2/1975 | Hultsch | B01D 33/11 494/39 |
| 3,943,056 | A * | 3/1976 | Hultsch | B04B 15/08 210/744 |
| 3,959,140 | A | 5/1976 | Legras | |
| 3,989,185 | A * | 11/1976 | Mercier | B04B 11/02 494/67 |
| 4,000,074 | A * | 12/1976 | Evans | B04B 3/025 494/47 |
| 4,052,303 | A * | 10/1977 | Hultsch | B04B 15/08 494/900 |
| 4,052,304 | A * | 10/1977 | Vertenstein | B04B 3/00 494/36 |
| 4,063,959 | A * | 12/1977 | Dietzel | B04B 3/00 127/19 |
| 4,101,421 | A * | 7/1978 | Hultsch | B04B 11/082 210/381 |
| 4,193,874 | A * | 3/1980 | Gerteis | B04B 3/025 210/232 |
| 4,200,530 | A * | 4/1980 | Mechalas | B01D 33/50 210/784 |
| 4,223,829 | A * | 9/1980 | Bange | B04B 9/04 494/9 |
| 4,269,711 | A * | 5/1981 | Gerteis | B04B 3/025 210/232 |
| 4,298,476 | A * | 11/1981 | Dudley | B04B 3/00 494/79 |
| 4,331,482 | A * | 5/1982 | Schaper | B04B 3/00 494/36 |
| 4,339,072 | A * | 7/1982 | Hiller | B04B 1/20 494/52 |
| 4,352,451 | A * | 10/1982 | Journet | B04B 3/00 494/36 |
| 4,360,431 | A * | 11/1982 | Little | B04B 11/00 210/380.1 |
| 4,362,620 | A * | 12/1982 | High | B04B 11/02 494/56 |
| 4,443,343 | A * | 4/1984 | Merz | D21F 13/00 210/768 |
| 4,455,844 | A | 6/1984 | McMillan et al. | |
| 4,518,621 | A * | 5/1985 | Alexander | B01D 33/56 210/405 |
| 4,608,040 | A * | 8/1986 | Knelson | B04B 1/00 209/486 |
| RE32,381 | E * | 3/1987 | Dudrey | B04B 3/00 494/60 |
| 4,776,833 | A * | 10/1988 | Knelson | B04B 15/10 209/486 |
| 4,842,722 | A | 6/1989 | Holz | |
| 4,848,105 | A | 7/1989 | O'Connell et al. | |
| 4,895,666 | A * | 1/1990 | Franzen | B04B 11/082 210/744 |
| 4,944,874 | A * | 7/1990 | Kobayashi | B01D 33/11 209/288 |

(56) References Cited

U.S. PATENT DOCUMENTS

| | | | | |
|---|---|---|---|---|
| 4,981,219 A * | 1/1991 | Burnell | B03B 5/00 | 494/67 |
| 4,988,623 A * | 1/1991 | Schwarz | C12N 5/0062 | 435/297.3 |
| 4,997,575 A * | 3/1991 | Hultsch | B04B 3/00 | 210/368 |
| 5,004,540 A * | 4/1991 | Hendricks | B04B 3/025 | 494/83 |
| 5,024,647 A * | 6/1991 | Jubin | B01D 11/048 | 494/79 |
| 5,030,361 A * | 7/1991 | Ishida | C12M 47/02 | 210/772 |
| 5,031,522 A * | 7/1991 | Brixel | B04B 7/18 | 494/36 |
| 5,032,258 A * | 7/1991 | Hultsch | B04B 3/00 | 210/120 |
| 5,092,995 A * | 3/1992 | Gerteis | B04B 3/025 | 494/23 |
| 5,127,587 A * | 7/1992 | Johnson | B01D 33/11 | 241/46.016 |
| 5,163,895 A * | 11/1992 | Titus | B04B 3/00 | 494/56 |
| 5,169,525 A * | 12/1992 | Gerteis | B04B 3/025 | 494/23 |
| 5,222,933 A * | 6/1993 | Knelson | B04B 1/00 | 494/67 |
| 5,223,137 A * | 6/1993 | Hattori | B04B 11/08 | 210/368 |
| 5,227,066 A * | 7/1993 | Ishida | B04B 15/12 | 210/368 |
| 5,244,502 A * | 9/1993 | Schaper | B04B 11/06 | 494/67 |
| 5,246,600 A | 9/1993 | Reichner | | |
| 5,250,180 A * | 10/1993 | Chang | B04B 11/08 | 210/372 |
| 5,264,124 A * | 11/1993 | Nemedi | B04B 3/00 | 494/79 |
| 5,275,727 A * | 1/1994 | Nemedi | B04B 3/00 | 494/59 |
| 5,304,306 A * | 4/1994 | Gerteis | B04B 3/025 | 494/23 |
| 5,306,423 A * | 4/1994 | Hultsch | B04B 3/025 | 210/232 |
| 5,338,285 A * | 8/1994 | Omori | B04B 1/20 | 494/53 |
| 5,344,493 A * | 9/1994 | Jackson | B08B 7/0021 | 204/158.21 |
| 5,368,171 A * | 11/1994 | Jackson | B08B 3/06 | 210/167.01 |
| 5,368,541 A * | 11/1994 | Knelson | B04B 1/00 | 494/56 |
| 5,370,796 A * | 12/1994 | Grimwood | B29C 70/86 | 210/380.1 |
| 5,372,571 A * | 12/1994 | Knelson | B04B 1/00 | 494/67 |
| 5,421,997 A * | 6/1995 | Gerteis | B04B 3/025 | 210/90 |
| 5,458,776 A * | 10/1995 | Preisser | B04B 3/00 | 49/27 |
| 5,460,717 A * | 10/1995 | Grimwood | B04B 11/08 | 210/402 |
| 5,468,389 A * | 11/1995 | Keller | B04B 3/02 | 210/360.2 |
| 5,472,602 A * | 12/1995 | Feller | B04B 3/025 | 494/83 |
| 5,485,066 A * | 1/1996 | Zeigler | B04B 9/10 | 318/7 |
| 5,490,453 A * | 2/1996 | Mackay | A47J 19/027 | 494/56 |
| 5,505,863 A * | 4/1996 | Danon | G03F 7/3092 | 210/485 |
| 5,538,630 A * | 7/1996 | Burns | B04B 3/00 | 210/383 |
| 5,547,573 A * | 8/1996 | Martin | B04B 15/06 | 494/36 |
| 5,582,726 A * | 12/1996 | Feller | B04B 3/00 | 494/83 |
| 5,586,965 A * | 12/1996 | Knelson | B04B 1/00 | 494/56 |
| 5,601,523 A * | 2/1997 | Knelson | B04B 1/00 | 494/35 |
| 5,630,938 A * | 5/1997 | Feller | B04B 3/025 | 210/405 |
| 5,635,065 A * | 6/1997 | Spyra | B04B 3/02 | 494/67 |
| 5,665,925 A * | 9/1997 | Gerteis | G01G 1/18 | 73/1.13 |
| 5,713,826 A * | 2/1998 | West | B04B 11/06 | 494/67 |
| 5,759,411 A * | 6/1998 | Gold | C02F 1/5281 | 210/801 |
| 5,770,058 A * | 6/1998 | Jozwiak | B01D 21/262 | 210/171 |
| 5,771,601 A * | 6/1998 | Veal | F26B 17/26 | 34/314 |
| 5,784,902 A * | 7/1998 | Pinkowski | D06F 13/02 | 68/12.02 |
| 5,837,138 A * | 11/1998 | Boele | B01D 33/073 | 210/402 |
| 5,865,993 A * | 2/1999 | Wienicke | B04B 15/12 | 34/376 |
| 5,891,347 A * | 4/1999 | Matsumoto | B04B 11/08 | 210/402 |
| 5,956,858 A * | 9/1999 | Veal | F26B 5/08 | 34/166 |
| 5,988,398 A * | 11/1999 | Gerteis | B04B 15/08 | 494/83 |
| 6,033,563 A * | 3/2000 | Gerteis | B04B 3/025 | 494/83 |
| 6,068,707 A | 5/2000 | Magliocca | | |
| 6,159,360 A * | 12/2000 | Gerteis | B04B 3/025 | 34/550 |
| 6,210,311 B1 | 4/2001 | May | | |
| 6,314,824 B1 * | 11/2001 | Gerteis | B04B 11/043 | 73/1.13 |
| 6,408,703 B2 * | 6/2002 | Gerteis | G01G 1/18 | 73/1.87 |
| 6,424,067 B1 * | 7/2002 | Samways | B04B 9/12 | 494/83 |
| 6,440,316 B1 * | 8/2002 | Yoon | B04B 3/00 | 210/781 |
| 6,495,038 B1 * | 12/2002 | Kondoh | B04B 7/02 | 210/392 |
| 6,622,618 B1 * | 9/2003 | Glucksman | A47J 43/24 | 494/60 |
| 6,755,969 B2 * | 6/2004 | Kirker | B04B 1/00 | 494/44 |
| 6,820,446 B2 | 11/2004 | Arai et al. | | |
| 6,869,389 B2 * | 3/2005 | Mackel | B04B 7/16 | 494/36 |
| 6,890,443 B2 * | 5/2005 | Adams | B01D 33/722 | 210/402 |
| 6,974,546 B2 * | 12/2005 | Wood | B01F 27/2723 | 210/748.04 |
| 6,997,859 B2 * | 2/2006 | Peacocke | B03B 5/32 | 494/80 |
| 7,105,090 B2 * | 9/2006 | Choo | A01K 63/045 | 210/426 |
| 7,144,360 B2 * | 12/2006 | Zonneveld | B04B 15/12 | 494/80 |
| 7,168,571 B2 * | 1/2007 | Gerteis | B04B 15/08 | 210/372 |
| 7,243,512 B2 | 7/2007 | Kim et al. | | |
| 7,311,816 B2 * | 12/2007 | Kessler | B04B 3/00 | 324/695 |
| 7,401,479 B2 * | 7/2008 | Fields | D06F 39/00 | 68/4 |

(56) References Cited

U.S. PATENT DOCUMENTS

| | | | |
|---|---|---|---|
| 7,445,123 B1 | 11/2008 | Chiou | |
| 7,503,888 B1* | 3/2009 | Peacocke | B04B 1/00 494/80 |
| 7,686,965 B2* | 3/2010 | Cook | C02F 1/004 210/781 |
| 7,846,259 B2 | 12/2010 | Magliocca | |
| 7,908,764 B1* | 3/2011 | Estes | C10L 9/00 34/58 |
| 8,042,281 B1* | 10/2011 | Estes | C10L 9/00 34/328 |
| 8,065,954 B2* | 11/2011 | Foster | A47J 36/00 99/336 |
| 8,485,367 B2 | 7/2013 | Mathew et al. | |
| 8,549,993 B2* | 10/2013 | Foster | A47J 36/00 99/407 |
| 8,647,516 B2* | 2/2014 | Love | B01D 33/39 210/408 |
| 8,746,261 B2 | 6/2014 | Welch | |
| 8,808,155 B2* | 8/2014 | Zonneveld | B04B 7/08 494/67 |
| 8,815,292 B2* | 8/2014 | Watson | A61K 31/58 514/171 |
| 8,959,961 B2 | 2/2015 | Jenkins et al. | |
| 8,974,545 B2 | 3/2015 | Burkinshaw et al. | |
| 8,980,325 B2* | 3/2015 | Watson | A61K 45/06 424/489 |
| 9,004,743 B2* | 4/2015 | Wood | C12M 27/00 366/172.1 |
| 9,011,922 B2* | 4/2015 | Watson | A61K 33/14 514/171 |
| 9,017,423 B2 | 4/2015 | Burkinshaw et al. | |
| 9,034,195 B2* | 5/2015 | Wood | C02F 1/74 210/750 |
| 9,107,559 B2 | 8/2015 | Tuller et al. | |
| 9,121,000 B2 | 9/2015 | Burkinshaw et al. | |
| 9,126,233 B2* | 9/2015 | Sierens | B07B 1/24 |
| 9,127,882 B2 | 9/2015 | Jenkins et al. | |
| 9,155,985 B2 | 10/2015 | Yanda | |
| 9,198,929 B2* | 12/2015 | Watson | A61P 21/00 |
| 9,237,836 B2 | 1/2016 | Blanchard et al. | |
| 9,248,455 B2* | 2/2016 | Teduka | B04B 7/18 |
| 9,272,000 B2* | 3/2016 | Watson | A61K 47/02 |
| 9,297,107 B2 | 3/2016 | Jenkins | |
| 9,315,766 B2 | 4/2016 | He et al. | |
| 9,393,505 B2* | 7/2016 | Rusconi Clerici | B02C 18/10 |
| 9,402,803 B2* | 8/2016 | Archambeau | A61P 27/04 |
| 9,404,210 B2 | 8/2016 | He et al. | |
| 9,410,278 B2 | 8/2016 | He et al. | |
| 9,476,155 B2 | 10/2016 | He et al. | |
| 9,487,898 B2 | 11/2016 | He et al. | |
| 9,511,333 B2* | 12/2016 | Wood | A61K 33/00 |
| 9,512,398 B2* | 12/2016 | Wood | B01F 23/23 |
| 9,523,090 B2* | 12/2016 | Watson | C12N 13/00 |
| 9,523,169 B2 | 12/2016 | Sawford et al. | |
| 9,550,966 B2 | 1/2017 | Burkinshaw et al. | |
| 9,555,352 B2* | 1/2017 | Stiles, Jr. | B01D 29/23 |
| 9,587,337 B2 | 3/2017 | He et al. | |
| 9,587,340 B2 | 3/2017 | Jenkins et al. | |
| 9,596,974 B1 | 3/2017 | Dries | |
| 9,631,314 B2 | 4/2017 | Yin et al. | |
| 9,649,006 B2 | 5/2017 | Dries | |
| 9,693,670 B2 | 7/2017 | Dries | |
| 9,745,567 B2* | 8/2017 | Watson | C12N 13/00 |
| 9,751,094 B2* | 9/2017 | Gardiner | B04B 3/00 |
| 9,803,307 B2 | 10/2017 | Jenkins et al. | |
| 9,834,881 B2 | 12/2017 | Sawford et al. | |
| 9,845,516 B2 | 12/2017 | Steele | |
| 9,850,455 B2 | 12/2017 | Jenkins et al. | |
| 9,850,619 B2 | 12/2017 | Wells et al. | |
| 9,914,901 B2 | 3/2018 | Burkinshaw et al. | |
| 9,932,700 B2 | 4/2018 | Wells et al. | |
| 10,017,895 B2 | 7/2018 | Wells et al. | |
| 10,052,640 B2* | 8/2018 | Vicentini | B04B 7/04 |
| 10,081,900 B2 | 9/2018 | Wells et al. | |
| 10,125,359 B2* | 11/2018 | Watson | A61P 29/00 |
| 10,287,642 B2 | 5/2019 | Scott | |
| 10,301,691 B2 | 5/2019 | Feyisa et al. | |
| 10,316,448 B2 | 6/2019 | He et al. | |
| 10,494,590 B2 | 12/2019 | Abercrombie et al. | |
| 10,513,746 B2* | 12/2019 | Myers | B04B 3/00 |
| 10,590,499 B2 | 3/2020 | Ashfaq et al. | |
| 10,597,814 B2 | 3/2020 | Wells et al. | |
| 10,639,647 B2* | 5/2020 | Meier | B04B 11/02 |
| 10,648,120 B2* | 5/2020 | Gonzaga | D06F 13/00 |
| 10,695,774 B2* | 6/2020 | Corbus | B04B 15/06 |
| 10,745,769 B2 | 8/2020 | Steele | |
| 10,773,976 B2 | 9/2020 | Scott et al. | |
| 10,781,404 B2 | 9/2020 | Bird et al. | |
| 10,808,289 B2 | 10/2020 | Sadeghi et al. | |
| 10,927,622 B2* | 2/2021 | Newman | B01D 21/262 |
| 11,007,539 B2* | 5/2021 | Weingartner | B04B 7/18 |
| 11,299,839 B2 | 4/2022 | Jones et al. | |
| 11,414,633 B2 | 8/2022 | Bird et al. | |
| 11,414,806 B2* | 8/2022 | Gonzaga | D06F 39/02 |
| 11,697,854 B2* | 7/2023 | Mahrholz | B04B 11/02 127/56 |
| 2002/0017148 A1* | 2/2002 | Gerteis | G01G 1/18 73/865 |
| 2002/0030024 A1* | 3/2002 | Leung | B04B 1/2008 210/376 |
| 2004/0104158 A1 | 6/2004 | Kim et al. | |
| 2004/0121892 A1* | 6/2004 | Zonneveld | B04B 11/06 494/67 |
| 2005/0000869 A1* | 1/2005 | Kessler | B04B 3/00 494/36 |
| 2005/0161391 A1 | 7/2005 | Ettlinger | |
| 2006/0175245 A1* | 8/2006 | Gerteis | B04B 3/025 210/372 |
| 2007/0051245 A1* | 3/2007 | Yun | B01D 47/10 96/281 |
| 2007/0215560 A1* | 9/2007 | Whisler | B04B 3/06 210/781 |
| 2008/0190870 A1 | 8/2008 | Schoeb | |
| 2009/0044706 A1* | 2/2009 | Foster | A47J 36/00 99/410 |
| 2009/0045147 A1* | 2/2009 | Schmid | B04B 15/12 210/772 |
| 2009/0071912 A1 | 3/2009 | Mishina et al. | |
| 2009/0098259 A1* | 4/2009 | McEllen | A23B 7/015 426/240 |
| 2009/0118111 A1* | 5/2009 | Baumann | B04B 5/005 494/84 |
| 2009/0236296 A1* | 9/2009 | Schmid | B04B 11/082 210/377 |
| 2009/0321333 A1* | 12/2009 | Magliocca | A47J 37/1223 210/167.28 |
| 2010/0130340 A1* | 5/2010 | Denk | B04B 7/06 494/12 |
| 2010/0187190 A1 | 7/2010 | Kehl | |
| 2010/0258109 A1* | 10/2010 | Foster | A47J 37/1219 126/299 E |
| 2011/0011795 A1* | 1/2011 | Hoff | B04B 5/005 210/512.1 |
| 2011/0061545 A1* | 3/2011 | Foster | A47J 36/00 99/407 |
| 2011/0079044 A1* | 4/2011 | Teduka | B04B 15/10 62/123 |
| 2011/0290719 A1 | 12/2011 | Mathew et al. | |
| 2011/0296628 A1 | 12/2011 | Jenkins et al. | |
| 2011/0315621 A1* | 12/2011 | Heley | B04B 7/16 210/232 |
| 2012/0012011 A1* | 1/2012 | Millikin | A47J 36/00 99/410 |
| 2012/0048299 A1 | 3/2012 | Jenkins et al. | |
| 2012/0055345 A1* | 3/2012 | Foster | A47J 37/1276 99/410 |
| 2012/0055887 A1* | 3/2012 | Love | B01D 33/56 210/411 |
| 2012/0118336 A1 | 5/2012 | Welch | |
| 2012/0285868 A1* | 11/2012 | Sierens | B07B 1/24 209/288 |

(56) References Cited

U.S. PATENT DOCUMENTS

| | | | |
|---|---|---|---|
| 2013/0005559 A1* | 1/2013 | Burford | B04B 5/005 |
| | | | 494/41 |
| 2013/0133250 A1 | 5/2013 | Chan | |
| 2013/0140248 A1 | 6/2013 | Yanda | |
| 2013/0167882 A1 | 7/2013 | Burkinshaw et al. | |
| 2014/0021134 A1* | 1/2014 | Lechuga Andrade | B01D 63/16 |
| | | | 210/652 |
| 2014/0124431 A1* | 5/2014 | Love | B01D 33/56 |
| | | | 210/330 |
| 2014/0197116 A1 | 7/2014 | Yanda | |
| 2014/0201929 A1 | 7/2014 | He et al. | |
| 2014/0238446 A1 | 8/2014 | Welch | |
| 2014/0317860 A1 | 10/2014 | He et al. | |
| 2014/0346126 A1* | 11/2014 | Teduka | B01D 17/08 |
| | | | 210/769 |
| 2015/0027173 A1 | 1/2015 | Wu et al. | |
| 2015/0096128 A1 | 4/2015 | Sawford et al. | |
| 2015/0136683 A1* | 5/2015 | Rusconi Clerici | B02C 18/0092 |
| | | | 210/368 |
| 2015/0175945 A1 | 6/2015 | Waddon et al. | |
| 2015/0238977 A1* | 8/2015 | Meier | B04B 11/06 |
| | | | 494/36 |
| 2015/0252511 A1 | 9/2015 | Roberts et al. | |
| 2015/0299615 A1* | 10/2015 | Lee | A23K 50/00 |
| | | | 554/177 |
| 2015/0343334 A1* | 12/2015 | Jons | B01D 29/33 |
| | | | 210/195.1 |
| 2015/0367256 A1 | 12/2015 | Takahashi | |
| 2016/0115065 A1* | 4/2016 | Yamashita | C02F 11/125 |
| | | | 210/174 |
| 2016/0115066 A1* | 4/2016 | Yamashita | C02F 11/121 |
| | | | 210/252 |
| 2016/0195409 A1 | 7/2016 | Goldberg et al. | |
| 2016/0197998 A1 | 7/2016 | Carleo | |
| 2016/0198926 A1 | 7/2016 | Dries | |
| 2016/0206173 A1 | 7/2016 | Durham et al. | |
| 2016/0236207 A1* | 8/2016 | Vicentini | B04B 15/06 |
| 2016/0251602 A1 | 9/2016 | Steele et al. | |
| 2016/0251603 A1 | 9/2016 | Steele et al. | |
| 2016/0310970 A1* | 10/2016 | Gardiner | B04B 11/06 |
| 2017/0051447 A1 | 2/2017 | He et al. | |
| 2017/0073878 A1 | 3/2017 | Xu et al. | |
| 2017/0079502 A1 | 3/2017 | Dries | |
| 2017/0144092 A1 | 5/2017 | Seeley | |
| 2017/0159222 A1 | 6/2017 | Jenkins et al. | |
| 2017/0233938 A1 | 8/2017 | Hwang et al. | |
| 2017/0240982 A1 | 8/2017 | Sadeghi | |
| 2017/0241061 A1 | 8/2017 | Wells et al. | |
| 2017/0247771 A1 | 8/2017 | Scott | |
| 2018/0057777 A1 | 3/2018 | Waddon et al. | |
| 2018/0134994 A1 | 5/2018 | Steele et al. | |
| 2018/0141089 A1 | 5/2018 | Sawford et al. | |
| 2018/0216049 A1 | 8/2018 | Bird et al. | |
| 2018/0313023 A1 | 11/2018 | Piekarski et al. | |
| 2019/0017215 A1* | 1/2019 | Gonzaga | D06F 13/00 |
| 2019/0211288 A1 | 7/2019 | Potts et al. | |
| 2019/0233760 A1 | 8/2019 | Lavery et al. | |
| 2019/0247864 A1* | 8/2019 | Wu | B01D 17/0217 |
| 2020/0002650 A1 | 1/2020 | Servin et al. | |
| 2020/0179950 A1* | 6/2020 | Weingartner | B04B 7/12 |
| 2020/0179991 A1* | 6/2020 | Borghi | B01D 39/2027 |
| 2020/0199804 A1 | 6/2020 | Magnusson | |
| 2020/0240069 A1* | 7/2020 | Gonzaga | D06F 39/02 |
| 2020/0254463 A1* | 8/2020 | Goertz | B01D 29/073 |
| 2020/0299790 A1* | 9/2020 | Mahrholz | B04B 11/04 |
| 2020/0316501 A1* | 10/2020 | Jones | A47L 15/4208 |
| 2020/0378054 A1 | 12/2020 | Cobb et al. | |
| 2021/0069730 A1* | 3/2021 | Stephens | B01D 11/0273 |
| 2021/0162325 A1* | 6/2021 | Krampe | C02F 1/004 |
| 2021/0179979 A1 | 6/2021 | Servin et al. | |
| 2021/0220843 A1* | 7/2021 | Stephens | B01D 11/0273 |
| 2021/0229112 A1* | 7/2021 | Stephens | B04B 3/00 |
| 2021/0269961 A1 | 9/2021 | Jones et al. | |
| 2021/0292957 A1 | 9/2021 | Jones et al. | |
| 2021/0316235 A1* | 10/2021 | Lee | B01D 33/82 |
| 2021/0402418 A1* | 12/2021 | Zheng | B04B 3/00 |
| 2022/0001397 A1* | 1/2022 | Dunsmuir | B04B 3/00 |
| 2022/0016646 A1* | 1/2022 | Lee | F26B 3/06 |
| 2022/0259790 A1 | 8/2022 | Jones et al. | |
| 2022/0298712 A1 | 9/2022 | Mattley et al. | |
| 2022/0356628 A1 | 11/2022 | Jones et al. | |

FOREIGN PATENT DOCUMENTS

| | | |
|---|---|---|
| CN | 200971442 Y | 11/2007 |
| CN | 201026461 Y | 2/2008 |
| CN | 201031312 Y | 3/2008 |
| CN | 101545194 A | 9/2009 |
| CN | 101566174 A | 10/2009 |
| CN | 201407724 Y | 2/2010 |
| CN | 201473788 U | 5/2010 |
| CN | 101988257 A | 3/2011 |
| CN | 102061588 A | 5/2011 |
| CN | 102061589 A | 5/2011 |
| CN | 202175862 U | 3/2012 |
| CN | 102425053 A | 4/2012 |
| CN | 102425055 A | 4/2012 |
| CN | 202214631 U | 5/2012 |
| CN | 202214633 U | 5/2012 |
| CN | 202298219 U | 7/2012 |
| CN | 202298220 U | 7/2012 |
| CN | 202298222 U | 7/2012 |
| CN | 202323458 U | 7/2012 |
| CN | 202359387 U | 8/2012 |
| CN | 202359388 U | 8/2012 |
| CN | 202359389 U | 8/2012 |
| CN | 202359390 U | 8/2012 |
| CN | 202359396 U | 8/2012 |
| CN | 302020695 S | 8/2012 |
| CN | 202492706 U | 10/2012 |
| CN | 202543634 U | 11/2012 |
| CN | 202543635 U | 11/2012 |
| CN | 202543646 U | 11/2012 |
| CN | 202543652 U | 11/2012 |
| CN | 102899848 A | 1/2013 |
| CN | 202644211 U | 1/2013 |
| CN | 202688698 U | 1/2013 |
| CN | 202755220 U | 2/2013 |
| CN | 202755221 U | 2/2013 |
| CN | 102953249 A | 3/2013 |
| CN | 102953250 A | 3/2013 |
| CN | 102953262 A | 3/2013 |
| CN | 102978870 A | 3/2013 |
| CN | 103061084 A | 4/2013 |
| CN | 103061085 A | 4/2013 |
| CN | 103061086 A | 4/2013 |
| CN | 103061087 A | 4/2013 |
| CN | 103087839 A | 5/2013 |
| CN | 103103720 A | 5/2013 |
| CN | 103103721 A | 5/2013 |
| CN | 103122566 A | 5/2013 |
| CN | 103122567 A | 5/2013 |
| CN | 202913242 U | 5/2013 |
| CN | 103225192 A | 7/2013 |
| CN | 203049283 U | 7/2013 |
| CN | 203123683 U | 8/2013 |
| CN | 103290653 A | 9/2013 |
| CN | 103361934 A | 10/2013 |
| CN | 103361938 A | 10/2013 |
| CN | 203370359 U | 1/2014 |
| CN | 103556439 A | 2/2014 |
| CN | 103638750 A | 3/2014 |
| CN | 203530695 U | 4/2014 |
| CN | 203530700 U | 4/2014 |
| CN | 203530714 U | 4/2014 |
| CN | 203530718 U | 4/2014 |
| CN | 203530723 U | 4/2014 |
| CN | 203530725 U | 4/2014 |
| CN | 203852919 U | 10/2014 |
| CN | 204097757 U | 1/2015 |
| CN | 103285643 B | 4/2015 |
| CN | 204293963 U | 4/2015 |
| CN | 204428977 U | 7/2015 |

(56) References Cited

FOREIGN PATENT DOCUMENTS

| | | |
|---|---|---|
| CN | 204455619 U | 7/2015 |
| CN | 103451894 B | 11/2015 |
| CN | 103556434 B | 11/2015 |
| CN | 103556436 B | 11/2015 |
| CN | 103556431 B | 1/2016 |
| CN | 105333505 A | 2/2016 |
| CN | 103556432 B | 3/2016 |
| CN | 105420992 A | 3/2016 |
| CN | 105420993 A | 3/2016 |
| CN | 105421000 A | 3/2016 |
| CN | 105442267 A | 3/2016 |
| CN | 205088465 U | 3/2016 |
| CN | 205329373 U | 6/2016 |
| CN | 205329374 U | 6/2016 |
| CN | 205329380 U | 6/2016 |
| CN | 205329384 U | 6/2016 |
| CN | 105797519 A | 7/2016 |
| CN | 205501658 U | 8/2016 |
| CN | 205559299 U | 9/2016 |
| CN | 205886468 U | 1/2017 |
| CN | 205917483 U | 2/2017 |
| CN | 106702688 A | 5/2017 |
| CN | 106948137 A | 7/2017 |
| CN | 107083653 A | 8/2017 |
| CN | 107485909 A | 12/2017 |
| CN | 107574630 A | 1/2018 |
| CN | 108330630 A | 7/2018 |
| CN | 207614500 U | 7/2018 |
| CN | 108455777 A | 8/2018 |
| CN | 107281813 B | 8/2019 |
| DE | 10230488 A1 | 1/2004 |
| EP | 0289674 A1 | 11/1988 |
| EP | 1101518 A2 | 5/2001 |
| EP | 1201812 B1 | 8/2005 |
| EP | 0980669 B1 | 6/2008 |
| EP | 2778272 A1 | 9/2014 |
| EP | 2949627 A1 | 12/2015 |
| EP | 2445533 B1 | 2/2017 |
| EP | 3124674 A1 | 2/2017 |
| EP | 3385440 A1 | 10/2018 |
| EP | 3727639 B1 | 6/2023 |
| FR | 2550710 A1 | 2/1985 |
| GB | 2576859 A | 3/2020 |
| GB | 2581790 A | 9/2020 |
| GB | 2582042 A | 9/2020 |
| GB | 2600921 A | 5/2022 |
| JP | S6072598 A | 4/1985 |
| JP | S60145191 A | 7/1985 |
| JP | 2005-531433 A | 10/2005 |
| JP | 2007130380 A | 5/2007 |
| JP | 2011115554 A | 6/2011 |
| JP | 2014018767 A | 2/2014 |
| JP | 2018 175680 A | 11/2018 |
| KR | 20050081301 A | 8/2005 |
| KR | 20120090175 A | 8/2012 |
| KR | 20150103817 A | 9/2015 |
| WO | WO-95/27551 A1 | 10/1995 |
| WO | WO-98/31480 A1 | 7/1998 |
| WO | WO-2013181029 A1 | 12/2013 |
| WO | WO-2015049705 A1 * | 4/2015 ............ B04B 11/02 |
| WO | WO-2015/142863 A1 | 9/2015 |
| WO | WO-2016032344 A2 | 3/2016 |
| WO | WO-2015/049544 A1 | 2/2017 |
| WO | WO-2018/172725 A1 | 9/2018 |
| WO | WO-2019017849 A1 | 1/2019 |
| WO | WO-2019017850 A1 | 1/2019 |
| WO | WO-2019081013 A1 | 5/2019 |
| WO | WO-2019122862 A1 * | 6/2019 ......... A47L 15/4208 |
| WO | WO-2020/012024 A1 | 1/2020 |
| WO | WO-2020/012026 A1 | 1/2020 |
| WO | WO-2020/012027 A1 | 1/2020 |
| WO | WO-2020/064830 A1 | 4/2020 |
| WO | WO-2021/014152 A1 | 1/2021 |
| WO | WO-2021/032986 A1 | 2/2021 |
| WO | WO-2022084677 A1 | 4/2022 |
| WO | WO-2022096880 A1 | 5/2022 |
| WO | WO-2022118034 A1 | 6/2022 |
| WO | WO-2022229646 A1 | 11/2022 |

OTHER PUBLICATIONS

International Search Report and Written Opinion for International Application No. PCT/GB2018/053677, mailed Jun. 27, 2019 (19 pages).

UK Search Report for Application No. GB1721348.9, dated Jun. 18, 2018 (5 pages).

UK Search Report for Application No. GB1721348.9, dated Sep. 21, 2018 (2 pages).

UK Search Report for Application No. GB1819577.6, dated May 20, 2019 (5 pages).

U.S. Appl. No. 17/258,396.

U.S. Appl. No. 17/258,406.

U.S. Appl. No. 17/280,519.

Blog post with images dated Aug. 14, 2017 retrieved from <https://blog.naver.com/ksl228/221073386850> on May 6, 2024 (16 pages).

* cited by examiner

CENTRIFUGAL FILTER UNIT FOR A WASHING MACHINE HAVING A REMOVABLE PORTION SHAPED TO SCRAPE AGAINST A SIDE WALL DURING ITS REMOVAL

The present disclosure relates to a centrifugal filter unit for a treatment apparatus used in the treatment of substrates with a treatment formulation, particularly a substrate which is or comprises a textile, and to a treatment apparatus comprising the filter. The present disclosure further relates to a method of filtering a treatment formulation and a method of treating a substrate.

Conventional methods for treating and cleaning of textiles and fabrics typically involve aqueous cleaning using large volumes of water. These methods generally involve aqueous submersion of fabrics followed by soil removal, aqueous soil suspension, and water rinsing. The use of solid particles to provide improvements in, and advantages over, these conventional methods is known in the art. For example PCT patent publication WO2007/128962 discloses a method for cleaning a soiled substrate using a multiplicity of solid particles. Other PCT patent publications which have related disclosures of cleaning methods include: WO2012/056252; WO2014/006424; WO2015/004444; WO2014/147391; WO2014/006425; WO 2012/035343 and WO2012/167545. These disclosures teach apparatus and methods for treating or cleaning a substrate which offer several advantages over conventional methods including: improved treating/cleaning performance, reduced water consumption, reduced consumption of detergent and other treatment agents, and better low temperature treating/cleaning (and thus more energy efficient treating/cleaning). Other patent publications, for instance WO2014/167358, WO2014/167359, WO2016/051189, WO2016/055789 and WO2016/055788, teach the advantages provided by solid particles in other fields such as leather treatment and tanning.

However, in conventional methods that use large volumes of water and in methods using solid particles, there remains a problem of adequate removal of solid waste fibres and particles derived from the substrate, such as lint, prior to the effluent liquid from such methods going to a drain. In particular, treating, such as washing, of clothing derived from synthetic material, such as acrylic, nylon and polyester, can result in microscopic particles or fibres being removed from the clothing and taken with effluent liquid to the drain. Microfibers of synthetic material can then reach waterways where they can negatively impact on river and marine life. With the rising appreciation of the potential damage caused to rivers, lakes, seas and oceans by the presence of waste plastic material, there is an increasing requirement to significantly reduce or eliminate solid material from being allowed to enter drainage and sewage systems. The United Nations Goal 14 includes the target of preventing and significantly reducing marine pollution of all kinds including marine debris and nutrient pollution, in particular from land-based activities. U.S. Pat. No. 6,820,446 B2 discloses a centrifugal force filtering device for use in filtering flocks from polluted water, wherein the flocks are formed by flocculating a chemical pollutant in the water using a flocculant. The flocks are lighter than water, and therefore concentrate in a central portion of the filtering cylinder, becoming sparse in a peripheral portion. This is said to prevent the flocks from adhering to and thereby clogging the peripheral surface of the filtering cylinder. However, U.S. Pat. No. 6,820,446 B2 does not address the problem of removing from a treatment formulation solid waste fibres and particles derived from the substrate in a substrate treatment process or the situation where there is build-up of solid material on the surface of the filter.

EP 0956133 B1 and EP 1101518 both disclose a drum filter and a cleaning assembly comprising a drum filter. However, there remains a need to provide an improved centrifugal filter unit, for example, that can be more easily accommodated in a cleaning apparatus, that has improved filtering performance and that can be more readily emptied of filtered solid material.

It is an object of the present invention to improve removal of solid waste material from the effluent of treatment apparatus used in the treatment of substrates with a treatment formulation, particularly to improve the removal of solid waste material derived from the substrate being treated.

According to a first aspect of the invention, there is provided a centrifugal filter unit for an apparatus, wherein the apparatus is for use in the treatment of a substrate with a treatment formulation, the centrifugal filter unit comprising;

a) a housing having an outlet configured to allow a filtrate to exit the centrifugal filter unit;
b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
c) a lid configured to substantially seal the first end of the housing;
d) an inlet configured to allow a feed to enter the filter chamber;
e) a cap at the first end of the filter, wherein the cap comprises an aperture that cooperates with the inlet to allow the feed to enter the filter chamber;
f) a drive means for rotating the filter; and
g) an impeller, wherein the impeller is comprised in the filter chamber;
wherein the centrifugal filter unit is configured such that when the impeller rotates, the feed is drawn in to the filter chamber through the inlet and liquid is expelled through the perforations.

According to a second aspect of the invention, there is provided a centrifugal filter unit for an apparatus, wherein the apparatus is for use in the treatment of a substrate with a treatment formulation, the centrifugal filter unit comprising;

a) a housing having an outlet configured to allow a filtrate to exit the centrifugal filter unit;
b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
c) an inlet configured to allow a feed to enter the filter chamber;
d) a cap at the first end of the filter, wherein the cap comprises an aperture that cooperates with the inlet to allow the feed to enter the filter chamber;
e) a drive means for rotating the filter; and f) an impeller, wherein the impeller is comprised in the filter chamber.

In the second aspect of the invention, preferably the centrifugal filter unit further comprises a lid, configured to substantially seal the first end of the housing.

For the first aspect of the invention and the second aspect of the invention, the presence of a rotating filter effects centrifugal filtration of the feed. Furthermore, by having an impeller inside the filter chamber, centrifugal filtration is improved because the impeller increases the force by which liquid is expelled through the filter. In particular, the presence of the impeller improves filtration because expulsion of liquid through the filter is ameliorated even when filtered solid material builds up on the inside surface of the filter in the filter chamber. In this way, effective filtration of treatment formulation can take place for a longer duration without the need to clean the filter.

A further advantage of the centrifugal filter unit of the first aspect of the invention comprising an impeller in the filter chamber is that centrifugal filter unit is able to function as a combined filter and pump. In particular, the centrifugal filter unit is able to generate its own flow of the feed without the need for a separate pump. Depending on the arrangement of the apparatus in which the centrifugal filter unit is used, the centrifugal filter unit may be able to function as the only pump in the apparatus. For example, where the centrifugal filter unit is comprised in a recirculation means of an apparatus, the centrifugal filter unit may obviate the need for the recirculation means to comprise a separate pump. Being able to dispense with a separate pump improves the ease of accommodating the centrifugal filter unit in an apparatus. Preferably, the lid is configured to completely seal the first end of the housing such that the first end of the housing is air-tight as well as water-tight. In this way, further improved pumping can be achieved.

Where the centrifugal filter unit of the second aspect of the invention comprises a lid configured to substantially seal the first end of the housing, it also has the further advantage of being able to function as a combined filter and pump. In particular, the centrifugal filter unit is able to generate its own flow of the feed without the need for a separate pump. Depending on the arrangement of the apparatus in which the centrifugal filter unit is used, the centrifugal filter unit may be able to function as the only pump in the apparatus. For example, where the centrifugal filter unit is comprised in a recirculation means of an apparatus, the centrifugal filter unit may obviate the need for the recirculation means to comprise a separate pump. Being able to dispense with a separate pump improves the ease of accommodating the centrifugal filter unit in an apparatus. Preferably, the lid is configured to completely seal the first end of the housing such that the first end of the housing is air-tight as well as water-tight. In this way, further improved pumping can be achieved.

The following features described in relation to the first aspect of the disclosure also apply to each of the second to seventh aspects of the disclosure described herein:

The orientation of the centrifugal filter unit may depend on the configuration of the apparatus in which it is used. Typically, the centrifugal filter unit may be configured to operate in a substantially vertical orientation. Alternatively, the centrifugal filter unit may be configured to operate in a substantially horizontal orientation. As used herein, by "in a substantially vertical orientation" is meant that the first end of the filter is arranged substantially vertically above the second end of the filter and the axis of rotation of the filter is aligned substantially vertically. A substantially vertical orientation may allow for easier gravity-feeding of the material to be filtered into the filter chamber. For example, where the centrifugal filter unit is in a vertical orientation, the centrifugal filter unit may obviate the need for a separate pump. A substantially vertical orientation may dispense with the need to seal around the inlet or for the inclusion of a lid in the centrifugal filter unit. A substantially vertical orientation may also allow for easier self-priming of the centrifugal filter unit. As used herein, by "in a substantially horizontal orientation", is meant that the first end of the filter is substantially horizontal with respect to the second end of the filter. In this way, the axis of rotation of the filter is aligned substantially horizontally.

As used herein, a "feed" is the material to be filtered by the centrifugal filter. Typically, the feed is a liquid comprising a solid material. Typically, the feed comprises treatment formulation that has been used in the treatment of a substrate. The amount of solid material in the feed may vary depending on the substrate being treated, the type of treatment and the stage of the treatment. As such the concentration of solid in the feed may vary considerably. Preferably, the feed is a fluid. Preferably, the feed is not in the form of a paste or semi-solid.

Typically, where the centrifugal filter unit is used in the treatment of substrates such as textiles, for example the cleaning of textiles or the treatment of denim, the concentration of solid material in the feed prior to entry into the centrifugal filter unit (as a percentage of the total mass of the solid material and the liquid) is less than about 30 wt %, preferably less than about 20 wt %, preferably less than about 10 wt %, more preferably less than about 5 wt %. The concentration of solid material in the feed (as a percentage of the total mass of the solid material and the liquid) is typically at least about 0.001 wt %, or at least about 0.01 wt %, or at least about 0.1 wt %. Preferably, the feed comprises from about 0.01 wt % to about 5 wt % solid material, more preferably from about 0.1 wt % to about 3.5 wt % solid material. Typically, the concentration of solid material in the feed is in relation to solid material having a largest dimension of at least about 10 µm. Typically, the solid material has a largest dimension of less than about 5 mm, preferably less than about 2 mm, more preferably less than about 1 mm.

Typically, the drive means comprises a motor. The power of the motor may be selected depending on the apparatus in which the centrifugal filter unit is being used. When the centrifugal filter unit is for use in a domestic apparatus, typically, the power of the motor is about 30 W to about 60 W, or about 40 W to about 50 W. When the centrifugal filter unit is for use in a commercial or an industrial apparatus, the power of the motor is typically considerably higher. Generally, the more substrate and treatment formulation that can be handled by an apparatus, the higher the power of the motor of the centrifugal filter unit needs to be.

Typically, the drive means comprises a drive shaft. The drive means may also comprise a clutch mechanism for engaging and disengaging rotation of a drive shaft. Having a clutch mechanism may be advantageous in order to protect the motor if there is a blockage in the filter chamber.

The centrifugal filter unit may comprise a controller for the drive means. Alternatively, the controller may be remote from the centrifugal filter unit, for example, the controller may be positioned elsewhere in the apparatus in which the centrifugal filter is used, such as next to or as part of another controller for controlling other functions of the apparatus. By having a controller for the drive means, operation of the centrifugal filter unit can be controlled. For example, the speed of rotation of the filter can be selected and/or varied.

Furthermore, the duration of the period of rotation of the filter can be controlled, for example, the filter can be allowed to rotate throughout the operation of the apparatus for treating a substrate, or the filter can be made to rotate during specific individual or intermittent periods during the operation of the apparatus.

Preferably, the controller is operated or programmed to cause the drive means to rotate the filter at a first speed for filtering solid material from the feed and at a second speed for dewatering the filtered solid material. Prior to the filter being rotated at the second speed, typically either the feed is stopped from entering the inlet, for example by way of a valve prior to the inlet, or treatment formulation is substantially drained from the apparatus in which the centrifugal filter unit is used so that there is substantially no treatment liquid remaining in the apparatus that is able to constitute a feed. Typically, the second speed for dewatering the filtered solid material is higher than the first speed for filtering solid material from the feed. Operating the centrifugal filter unit such that the filter rotates at the second speed increases the centrifugal force and enables improved removal of liquid from the filtered solid material contained within the filter. Dewatering in this way compresses the solid material, for example forming a "filter cake", which improves the ease of removal of the solid material from the filter chamber. Compressed solid material is easier and more hygienic to handle and can be disposed of with normal waste. Compressing the solid material in this way advantageously increases the interval between needing to empty or clean the filter chamber. Dewatering also beneficially conserves liquid in the apparatus in which the centrifugal filter unit is used.

The rotation speed of the filter in the centrifugal filter unit during filtration of the treatment formulation may be selected depending on various factors, for example, the diameter of the filter, the type of filter material being used and/or the concentration of solid material in the feed. For example, where the filter comprised in the centrifugal filter unit has a diameter of about 75 mm, typically the rotation speed of the filter during filtration of the treatment formulation is from about 900 rpm to about 1300 rpm, preferably from about 1000 rpm to about 1200 rpm, more preferably about 1100 rpm. Alternatively, where the filter comprised in the centrifugal filter unit has a diameter of about 75 mm, the rotation speed of the filter during filtration of the treatment formulation is typically at least about 2,000 rpm, preferably at least about 2,500 rpm, more preferably at least about 3,000 rpm and especially preferably at least about 3,500 rpm. Surprisingly, higher spin speeds have been found to provide high filtration efficiencies. Preferably, the spin speed is no more than about 10,000 rpm, no more than about 15,000 rpm, no more than about 20,000 rpm, no more than about 25,000 rpm or no more than about 30,000 rpm. Spin speeds greater than about 30,000 rpm may be difficult to engineer and to balance.

Where the filter comprised in the centrifugal filter unit has a diameter of about 75 mm, the rotation speed of the filter during dewatering is typically from about 1300 rpm to about 1900 rpm, preferably from about 1400 rpm to about 1800 rpm, more preferably about 1600 rpm. Alternatively, where the filter comprised in the centrifugal filter unit has a diameter of about 75 mm, the rotation speed of the filter during dewatering is typically at least about 2,000 rpm, preferably at least about 2,500 rpm, more preferably at least about 3,000 rpm and especially preferably at least about 3,500 rpm. Preferably, the spin speed is no more than about 10,000 rpm, no more than about 15,000 rpm, no more than about 20,000 rpm, no more than about 25,000 rpm or no more than about 30,000 rpm. Spin speeds greater than about 30,000 rpm may be difficult to engineer and to balance.

Typically, rotation of the filter is such as to provide G forces at the interior walls of the filter furthest away from the axis of rotation of from about 25 G to about 150 G, preferably from about 40 G to about 100 G. G is a function of filter size and the speed of rotation of the filter. G may be calculated as described, for example, in EP2663683B1. Thus, for a filter of inner radius r (cm), rotating at R (revolutions per minute (rpm)) and taking g as the acceleration due to gravity at 9.81 m/s$^2$, then:

$$G=1.118\times10^{-5}rR^2$$

Alternatively, rotation of the filter is such as to provide G forces at the interior walls of the filter furthest away from the axis of rotation typically of from at least about 100 G, preferably at least about 200 G, more preferably at least about 300 G, yet more preferably at least about 400 G and especially preferably at least about 500 G. Higher G forces may advantageously allow for high filtration efficiencies. Preferably, the G force is no more than about 10,000 G, no more than about 20,000 G, no more than about 30,000 G, or no more than about 40,000 G. G forces greater than about 40,000 G may be difficult to engineer and to balance.

The centrifugal filter unit of the first and second aspects of the invention comprise an impeller. An impeller is optional in the third to seventh aspects described hereinbelow. Where the centrifugal filter unit comprises an impeller, typically, the impeller comprises a plurality of blades, which may also be referred to as vanes. Preferably, the impeller has 3 to 10 blades, preferably 4 to 8 blades, preferably 6 blades. Preferably, the blades of the impeller are positioned proximate the second end of the filter. Preferably, the blades of the impeller are not positioned proximate the first end of the filter. Typically the blades of the impeller are positioned in a half of the filter chamber proximate the second end of the filter. In this way, feed that travels through the inlet of the housing is able to enter the filter chamber before reaching the impeller blades, which has an advantage of reducing build-up of filtered solid material proximate the inlet, thus reducing the chance of blockage of the inlet.

The impeller and the filter may both be rotated by the drive means. The filter is adapted to engage the drive means. Typically, the filter is shaped such that it engages a drive shaft of the drive means. The impeller and the filter may each be adapted to engage a drive means independently of each other. For example, the impeller and the filter may each have a mounting portion so that they directly engage a drive shaft of a drive means. Preferably, the impeller and the filter engage the same drive shaft. When the drive means operates, the drive shaft that the impeller and/or filter are connected to rotates, causing the impeller and the filter to be rotated. The impeller and the filter may be rotated at the same speed. Alternatively, the impeller may be rotated at a different speed to the speed of rotation of the filter, for example, where the impeller and the filter engage different drive shafts of the drive means or where there is a gearing mechanism that allows differential rotation between the filter and the impeller.

Typically, the drive means comprises a drive shaft that is splined, that is, the drive shaft comprises at least one spline. Typically, the drive shaft comprises from about 2 to about 10 splines, or from about 4 to about 8 splines. Having a draft shaft this is splined improves the ease of locating the filter and/or impeller and may also improve stability of the filter and/or impeller during rotation.

Preferably, the impeller is coupled to the filter such that the impeller rotates at the same speed as the filter. In this way, the impeller does not directly engage the drive means but is caused to rotate when the filter is rotated by the drive means. This arrangement has an advantage in that the impeller can be removed from the centrifugal filter unit more easily, that is, without needing to be disengaged from a drive shaft.

Typically, the impeller has a recess that engages a protrusion in the filter such that the relative position of the filter and the impeller is fixed. Alternatively, the impeller may have a protrusion that engages a recess in the filter. In these arrangements, when the filter is rotated, the impeller is caused to rotate at the same speed. Typically, the protrusion or recess in the filter has a plurality of shaped features that securely engage the impeller, preferably, the filter has a splined protrusion for engaging a recess in the impeller.

The lid is openable in the third aspect of the centrifugal filter unit described below. In the first, fifth and seventh aspects described herein, typically the lid is openable. In this way, the interior of the housing is accessible for removal of the solid material filtered from the feed or for maintenance of the centrifugal filter unit. Alternatively, in the first, fifth and seventh aspects described herein, the lid may be fixed in position and not openable, for example, where the centrifugal filter unit is disposable. In the arrangement of the second and sixth aspect where the centrifugal filter unit comprises a lid, preferably the lid is openable. In this way, the interior of the housing is accessible for removal of the solid material filtered from the feed or for maintenance of the centrifugal filter unit. Alternatively, the lid may be fixed in position and not openable, for example where the centrifugal filter unit is disposable.

The centrifugal filter unit may further comprise an attachment mechanism to secure the lid to the housing. For example, the attachment mechanism may comprise a clip, such as a quick-release clip, a screw thread, or a twist-lock mechanism. Preferably, the attachment mechanism comprises a quick-release clip.

The lid is configured to substantially seal the first end of the housing. Preferably, by "substantially seal the first end of the housing" is meant that the lid causes the first end of the housing to be water-tight, permitting ingress and egress of liquid from the centrifugal filter unit, such as the treatment formulation, only through the inlet or outlet of the housing.

When the centrifugal filter unit is configured to operate in a substantially horizontal orientation, preferably the lid does not comprise an air-release mechanism, such as air holes, or if an air-release mechanism, such as air holes, is present in the lid, they are arranged such that they can be closed during operation of the centrifugal filter unit. When the centrifugal filter unit is configured to operate in a substantially vertical orientation, the lid may comprise an air-release mechanism, such as air holes, but the lid still functions to substantially seal the first end of the housing, permitting ingress and egress of liquid from the centrifugal filter unit only through the inlet or outlet of the housing.

The lid may be configured to completely seal the first end of the housing. By "completely seal the first end of the housing" is meant that the lid causes the first end of the housing to be water-tight and air-tight.

Preferably, the lid comprises the inlet. Typically, the inlet is located approximately in the centre of the lid. The lid may comprise a handle or lever to assist with opening or removal of the lid.

The cap is preferably configured to cover the first end of the filter. Typically the cap prevents all solid material from leaving the filter chamber through the first end of the filter. Typically, the cap prevents the majority of the treatment formulation from exiting the filter chamber through the first end of the filter, preferably the cap seals the first end of the filter such that it prevents substantially all treatment formulation from exiting through the first end of the filter. In some arrangements, the cap is water-tight, for example, the cap may comprise a seal with the inlet, such as an O-ring or an oil seal, preferably an O-ring.

The side wall of the filter comprises perforations configured to allow liquid to pass through but to prevent solid material from passing through. The type of filter used and the density of and size of the perforations may be selected depending on the intended use of the centrifugal filter unit. In particular, the filter is selected depending on the amount, size and type of solid material that is desired to be prevented from passing through.

Typically, the perforations of the filter have an average largest dimension that is at least about 1 μm, preferably at least about 2 μm, more preferably at least about 5 μm, especially preferably at least about 10 μm. Typically, the perforations of the filter have an average largest dimension of no more than about 2 mm, preferably no more than about 1 mm, preferably no more than about 500 μm, preferably no more than about 250 μm, more preferably no more than about 100 μm. Typically the average largest dimension of the perforations is from about 10 μm to about 100 μm.

Typically, the perforations in the filter have an average largest dimension that is at least about 20 μm, preferably at least about 30 μm and more preferably at least about 40 μm. These dimensions may provide good flow rates, resistance to blockage and/or longer periods of use before the filter requires cleaning.

Typically, the perforations in the filter have an average largest dimension of no more than about 70 μm, preferably no more than about 50 μm, more preferably no more than about 40 μm and especially preferably no more than about 30 μm. These dimensions may provide good filtration efficiencies. Particularly, for fibrous solid materials having a longest linear dimension of greater than about 1 μm and typically no longer than about 5 mm, typically no longer than about 1 mm, these perforation dimensions provide advantageous filtration efficiencies. Fibrous solid materials, having a longest linear dimension of greater than about 1 μm and typically no longer than about 5 mm, typically no longer than about 1 mm, are typically referred to as "microfibers".

Typically, at least about 50%, at least about 60%, at least about 70%, at least about 80%, at least about 90%, at least about 95%, or at least about 99% of solid material in the feed is prevented from passing through the filter. The percentage of solid material that a filter is able to prevent from being passed through may be readily measured, for example, by measuring the mass of the filter (and impeller where present) when removed from the centrifugal filter unit and then mixing a known mass of solid material with a known volume of water to make a feed. The feed is added to the centrifugal filter unit via the inlet while the centrifugal filter unit is operated at a first speed of rotation of the filter. Once the flow of liquid leaving the outlet has substantially stopped, the rotation of the filter is increased to a second speed to thoroughly dewater the collected solid. By removing the filter (together with impeller if present) and measuring its mass at the end of the filtration, the mass of the collected solid can be calculated and, thus, the percentage of solid collected compared to the mass of solid mixed with water to make a feed can also be calculated.

Typically, material having a maximum dimension of greater than about 2 mm, of greater than about 1 mm, of greater than about 500 µm, of greater than about 200 µm, of greater than about 100 µm, of greater than about 50 µm, of greater than about 32 µm, of greater than about 10 µm, of greater than about 5 µm, or of greater than about 1 µm is prevented from passing through the filter. In some applications, a filter that is able to prevent sub-micron sized particles from passing through may be used.

Typically, fibrous solid materials having a longest linear dimension of greater than about 1 µm (that is, including "microfibers") are prevented from passing through the filter.

Typically, the filter prevents solid material having a maximum dimension greater than about 10 µm to greater than about 100 µm from passing through, preferably having a maximum dimension greater than about 10 µm to greater than about 50 µm from passing through. Although filters are available that can prevent solid material having a maximum dimension smaller than about 10 µm from passing through, a disadvantage in using such a filter is that, for example, bacteria can be prevented from passing through the filter, leaving such bacteria trapped in the collected solid material, which can lead to a potential health hazard for a user when removing the collected solid.

Preferably, by "prevent solid material from passing through" is meant at least about 50%, preferably at least about 60%, more preferably at least about 70%, more preferably at least about 80%, more preferably at least about 90%, more preferably at least about 95%, even more preferably at least about 99%, most preferably about 100% of solid material having a maximum dimension of greater than about 10 µm is prevented from passing through the filter. This is particularly preferred where the centrifugal filter unit is used in an apparatus for cleaning a substrate, such as in domestic or commercial laundry apparatus.

Preferably at least about 50%, preferably at least about 60%, more preferably at least about 70%, more preferably at least about 80%, more preferably at least about 90%, more preferably at least about 95%, even more preferably at least about 99%, most preferably about 100% of solid material having a maximum dimension of greater than about 1 µm is prevented from passing through the filter. This is particularly preferred where the centrifugal filter unit is used in an apparatus for cleaning a substrate, such as in domestic or commercial laundry apparatus.

Although a filter material typically has an inherent performance in terms of the size of solid material that it is able to prevent from passing through, the build-up of collected solid material on the filter during operation of the centrifugal filter unit can have the effect of improving the filtering performance of the filter. Thus, during operation of the centrifugal filter unit, the filtering performance of the filter material can improve such that solid material having a smaller maximum dimension can be prevented from passing through and/or a higher percentage of solid material of a certain size can be prevented from passing through. This increase in filtering performance is typically followed by an eventual decrease in performance prior to reaching the point where cleaning of the filter is needed.

The solid material collected typically includes fibres or particles derived from the substrate (also known as "lint"), soil or a combination thereof.

The filter may comprise any suitable material that prevents solid material from passing through but allows the passage of liquid. Typically, the filter comprises a mesh, preferably a metal or plastic woven mesh. Preferably, the filter comprises a woven nylon mesh. Preferably, the average perforation size of the woven mesh is less than about 40 µm, preferably less than about 30 µm, preferably about 25 µm, preferably less than 25 µm. Alternatively, the filter may comprise a non-woven fabric or mesh, sintered material, paper, a pleated filter, a wire wedge sheet or a chemically etched metal sheet, such as a steel sheet. The filter may comprise a single layer of filter material. Having a single layer of filter material has an advantage of providing a filter that is easy to clean. Alternatively, the filter may comprise more than one layer of filter material, typically two layers, typically three layers. A filter having more than one layer of filter material can have improved durability. Where the filter comprises more than one layer of filter material, for example, two layers where a first layer is nested inside a second layer with respect to the filter chamber, typically the size of the perforations in the first layer is smaller than the perforations in the second layer. Having a finer filter layer inside a coarser filter layer assists in reducing clogging of the two-layer filter. Having a coarser filter as the second layer can substantially improve the mechanical robustness of the two-layer filter.

Preferably, the filter comprises a filter material combined with a rigid structure, such as a moulded thermoplastic structure, to provide strength.

Preferably, the filter is cylindrical and has an inner surface that is smooth. This arrangement has an advantage of allowing easier emptying of the filter chamber and also allows easier cleaning of the inner surface of the filter to remove any collected solid material.

Preferably, the filter is removable from the housing. In this way, maintenance of the centrifugal filter unit may be carried out more readily. In particular, the filter may be cleaned more easily when it is removed from the housing.

The filter may be formed of a plurality of components. For example, the filter may comprise an outer cage and an inner cage, wherein the inner cage is nested within the outer cage and wherein the inner cage comprises filter material. The outer cage may provide additional structural support, particularly during rotation of the filter. The outer cage and the inner cage are preferably detachable from each other. For example, the inner cage may be removably attached to the outer cage by sprung release pins. The inner cage and the outer cage may be sequentially removable from the housing, such that the inner cage may be removed first and then the outer cage may be removed in a separate step, if desired. In this way, the inner cage can be removed from the centrifugal filter unit while the outer cage component of the filter remains in the housing. The outer cage can then be removed if needed but can remain in the housing during routine maintenance of the centrifugal filter unit. Alternatively, the outer cage may be permanently attached to the drive means such that only the inner cage of the filter may be removed. In this way, the inner cage component of the filter may be cleaned or may be replaced with a new inner cage while the outer cage is re-used.

The lid and the cap may be separate components. Alternatively, the cap may be comprised in the lid. In arrangements where the cap is comprised in the lid, the lid is configured to allow rotation of the filter without rotation of the cap portion of the lid. Preferably, the lid and the cap are separate components. Where the lid and cap are separate components, the cap is preferably configured to rotate with the filter.

The cap may form a non-contact seal with the lid. Preferably, the non-contact seal between the cap and the lid is configured to inhibit a return flow of liquid that has passed through the filter during rotation of the filter and to inhibit escape of feed from the filter chamber via the first end of the filter, thus preventing contamination of the liquid that has been filtered. The non-contact seal provides a tortuous path between the cap and the lid.

Typically, the non-contact seal is formed by an outermost surface of the cap cooperating with an innermost surface of the lid to form a tortuous path between the cap and the lid. Preferably, the cap forms a labyrinth seal with the lid. For example, the cap may comprise a first plurality of concentric rings on a side of the cap that faces away from the filter chamber and the lid may comprise a second plurality of concentric rings on a side of the lid that faces towards the filter chamber, wherein the first plurality of concentric rings are interspersed in relation to second plurality of concentric rings to form the labyrinth seal. Alternatively, the cap may comprise a first plurality of spiral segments on a side of the cap that faces away from the filter chamber and the lid may comprise a second plurality of spiral segments on a side of the lid that faces towards the filter chamber, wherein the first plurality of spiral segments are interspersed in relation to the second plurality of spiral segments to form the labyrinth seal.

Alternatively or in addition, the outlet of the housing may comprise a one-way valve, such as a flap valve, to prevent return flow of liquid to the filter chamber when the filter stops rotating.

Alternatively or in addition, the filter may comprise a flange at the first end of the filter that protrudes from the first end of the filter towards the housing. The flange may inhibit feed that has escaped from the first end of the filter chamber from contaminating filtered liquid.

Preferably, where the centrifugal filter unit is configured to operate in a substantially vertical orientation, the centrifugal filter unit may further comprise an overflow mechanism. Preferably, the overflow mechanism comprises an overflow aperture and an overflow collection chamber fluidly connected to the aperture. Preferably, the overflow aperture is comprised in the filter cap. Alternatively, or in addition, the overflow aperture is comprised in the filter chamber side wall. In this way, the overflow collection chamber may capture any feed that has escaped from the first end of the filter chamber. This is particularly useful when a build-up of collected solid material on the filter causes the filter to reduce in efficiency or become blocked such that feed escapes from the first end of the filter chamber. Preferably, when the filter becomes blocked, feed exits the first end of the filter chamber via the aperture in the cap and enters the overflow collection chamber. Alternatively, or in addition, the cap may comprise an additional overflow aperture. Alternatively, or in addition, the side wall of the filter chamber may comprise an additional overflow aperture, where the overflow aperture is located near the first end of the filter chamber. When the filter becomes blocked, feed may exit the first end of the filter chamber via the overflow aperture and enter the overflow collection chamber.

The overflow collection chamber may comprise an overflow outlet. In this way, feed that has passed into or collected in the overflow collection chamber can be released. The overflow outlet may drain into the housing, or into a separate outlet. Preferably, feed that has passed into or collected in the overflow collection chamber is released via the overflow outlet into the housing, on the other side of the filter to the filter chamber. Preferably, the separate outlet is a pipe or drain. In this way, feed that has passed into the collection chamber or collected therein can be released directly from the overflow collection chamber and not via the housing. The overflow outlet may comprise a valve that can be opened to selectively discharge collected feed from the overflow collection chamber. Thus, the valve may provide control over release of the feed that has collected in the overflow collection chamber and in this way, prevent contamination of the filtered fluid. Typically, the overflow collection chamber may be comprised in the lid.

Optionally, the overflow mechanism may further comprise an overflow sensor in the overflow collection chamber. The overflow sensor may be configured to detect when feed is overflowing from the filter chamber, when the collection chamber starts to fill or when a predetermined feed level is reached. Furthermore, the overflow sensor may be configured to alert a user. In this way, the user may be alerted when the filter has become blocked and feed is flowing via, flowing into, or collecting in the overflow collection chamber, enabling the user to take action, e.g. cleaning or replacing the filter.

Preferably, the centrifugal filter unit may further comprise an air-release mechanism. An air-pocket can form inside the filter chamber when the feed is introduced via the inlet, particularly where the centrifugal filter unit is in a substantially horizontal orientation, such that the first end of the filter is substantially horizontal with respect to the second end of the filter. Where there exists an air-pocket, operation of the centrifugal filter unit causes water to be flung to the outside of the filter by the centrifugal effect, whereas the air is drawn to the centre. In particular, in arrangements where the centrifugal filter unit comprises an impeller, the presence of trapped air in the filter chamber may have a significant detrimental effect on pump efficiency. Furthermore, having trapped air can cause turbulence within the filter chamber which can have the effect of dislodging solid material. By having an air-release mechanism, the disadvantageous effects of having an air-pocket in the filter chamber can be reduced.

Typically, the air-release mechanism is comprised in the cap. The air-release mechanism may comprise a channel having a first end, a second end and a mid-point, wherein the first end of the channel is positioned on a side of the cap that faces the filter chamber and the second end of the channel is positioned on a side of the cap faces away from the filter chamber, wherein the mid-point of the channel is positioned a distance from an axis of rotation of the filter that is closer than the distance from the axis of rotation of the filter at which the first end and the second end of the channel are positioned. Preferably, the channel has a U-bend shape. Preferably the air-release mechanism comprises a plurality of channels, preferably three to twelve channels, preferably six to nine channels, more preferably six channels. In arrangements where the cap rotates with the filter, having a plurality of channels is advantageous because it allows for air-release from the filter chamber regardless of the orientation of the cap when the filter stops rotating.

The position with respect to its distance from the axis of rotation of the filter of the first end of the channel and the second end of the channel can be varied in order to create an in-flow or out-flow through the cap. Preferably, the second end is closer to the axis of rotation than the first end as this provides an in-flow which assists in reducing potential contamination of filtered liquid by the feed. Alternatively or in addition, the air-release mechanism may comprise a second outlet in the housing. The second outlet may allow for removal, or "bleeding", of air from the centrifugal filter unit. In this way, the air-release mechanism may comprise the second outlet. Preferably, the second outlet is connected to a valve that can be opened to selectively release air from the centrifugal filter unit. For example, the valve may comprise a float valve.

Alternatively, or in addition, the second outlet may be comprised in the lid. An air-pocket can also form inside the centrifugal filter unit when the lid is secured to the housing. Advantageously, the second outlet allows for the escape and/or removal of air from the centrifugal filter unit. Advantageously, the second outlet allows for self-priming of the centrifugal filter unit. Preferably, the lid still functions to substantially seal the first end of the housing, permitting ingress and egress of liquid from the centrifugal filter unit only through the inlet or outlet of the housing, but air is permitted to be released from the air-release mechanism. Preferably, the second outlet comprises a closure that is moveable between a closed position, which prevents air from passing through the second outlet, and an open position, which allows air to pass through the second outlet.

Preferably, the second outlet may be connected to a valve that can be opened to selectively release air from the centrifugal filter unit. Alternatively, where the centrifugal filter unit is in a substantially vertical orientation, the second outlet may be permanently open.

Preferably the outlet of the housing is angled tangentially in order to substantially align with the direction of the flow of filtered liquid leaving the filter chamber. Preferably, the outlet is angled tangentially, such that it follows at least a portion of the outer surface of the housing. Optionally the outlet of the housing may have a helical configuration.

Typically, at least a portion of the housing may be transparent. In this way, the content of the housing may be viewed directly during operation of the centrifugal filter unit. This may be helpful, for example, to monitor the amount of filtered solid material that is contained in the filter chamber. In this way, an operator of the centrifugal filter unit may be able to readily see when maintenance of the centrifugal filter unit is needed. Alternatively or in addition, the centrifugal filter unit may comprise a sensor to monitor the amount of filtered solid material collected in the filter chamber. For example, the centrifugal filter unit may comprise a sensor to monitor flow rate through the filter chamber. For example, the sensor may be an optical sensor.

Alternatively or in addition, the centrifugal filter unit may comprise a turbidity sensor to monitor how clean the liquid exiting via the outlet is. Alternatively or in addition, a turbidity sensor may be located in the apparatus in which the centrifugal filter unit is used.

The housing and the filter may be any suitable shape that allows the filter to be rotatably mounted in the housing. Typically, the housing and the filter are both cylindrical. Alternatively, the housing may be conical in shape, wherein the first end of the housing has a smaller diameter than the second end of the housing. The conical housing tapers from the second end to the first end. This arrangement may have an advantage of increasing the rate of flow through the centrifugal filter unit. In particular, a conical housing may assist in directing the filtered liquid from the filter chamber to the outlet. Preferably, the centrifugal filter unit comprises a combination of a conical housing and a tangentially angled outlet which follows an outer surface of at least a portion of the housing. In this way, the rate of exit of the fluid from the centrifugal filter unit can be promoted. Alternatively, both the housing and the filter may be conical.

Typically, the centrifugal filter unit is configured such that it has an axial inlet and a radial outlet with respect to the rotatable filter.

Typically, the apparatus is a textile treatment apparatus. Preferably, the apparatus is a washing machine.

According to a third aspect of the invention, there is provided a centrifugal unit for an apparatus, wherein the apparatus is for use in the treatment of a substrate with a treatment formulation, the centrifugal filter unit comprising;
 a) a housing having an outlet configured to allow a filtrate to exit the centrifugal filter unit;
 b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
 c) a lid configured to substantially seal the first end of the housing, wherein the lid is openable;
 d) an inlet configured to allow a feed to enter the filter chamber;
 e) a cap at the first end of the filter, wherein the cap comprises an aperture that cooperates with the inlet to allow the feed to enter the filter chamber;
 f) a drive means for rotating the filter; and
 g) a removable portion configured to be positioned in the filter chamber during operation of the centrifugal filter unit and which when removed from the filter chamber following operation of the centrifugal filter unit takes with it at least a portion of the solid material prevented from passing through the perforations.

According to a fourth aspect of the invention, there is provided a centrifugal unit for an apparatus, wherein the apparatus is for use in the treatment of a substrate with a treatment formulation, the centrifugal filter unit comprising;
 a) a housing having an outlet configured to allow a filtrate to exit the centrifugal filter unit;
 b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
 c) an inlet configured to allow a feed to enter the filter chamber;
 d) a cap at the first end of the filter, wherein the cap comprises an aperture that cooperates with the inlet to allow the feed to enter the filter chamber;
 e) a drive means for rotating the filter; and
 f) a removable portion configured to be positioned in the filter chamber during operation of the centrifugal filter unit and which when removed from the filter chamber following operation of the centrifugal filter unit takes with it at least a portion of the solid material prevented from passing through the perforations.

According to the fourth aspect, the centrifugal filter unit may further comprise a lid, wherein the lid is openable.

The centrifugal filter unit of the third and fourth aspect provides for removal of the solid material filtered from the treatment formulation. An advantage of this arrangement is that the filter can be readily re-used rather than needing to be disposed of and replaced.

Furthermore, rather than having to try to remove solid material by accessing the centrifugal filter unit while it is positioned in an apparatus, the centrifugal filter unit of the third and fourth aspect of the disclosure is advantageous because the removable portion can be taken to a location at which the removal of the solid material from the removable portion can be effected more conveniently, for example, at a desk or counter, or near a waste or refuse bin. Thus, there is less chance that solid material will spill when emptying the centrifugal filter unit. Furthermore, having a removable portion avoids the need to position tools within the filter chamber to try to scoop out solid material, which is advantageous as it reduces damage to the filter chamber. This arrangement also avoids an operator having to put their fingers into the filter chamber, which could be dangerous and lead to finger or hand injury. Furthermore, this arrangement also allows an operator to avoid touching the collected solid material, which may comprise bacteria, for example.

Typically, the removable portion is configured to rotate with the filter. As such, the removable portion rotates at the same speed as the filter. In this way, the removable portion does not directly engage the drive means but is caused to rotate when the filter is rotated by the drive means. This arrangement may have an advantage in that the removable portion can be removed from the centrifugal filter unit more easily, that is, without needing to be disengaged from a drive shaft.

Typically, the removable portion has a recess that engages a protrusion in the filter such that the relative position of the filter and the removable portion is fixed. Alternatively, the removable portion may have a protrusion that engages a recess in the filter. Typically, the protrusion or recess in the filter has a plurality of shaped features that securely engage the removable portion, preferably, the filter has a splined protrusion for engaging a recess in the removable portion.

Alternatively, the removable portion may not directly engage the filter but may be connected to the cap. Preferably, the removable portion is configured to rotate with the cap. In this arrangement, the rotation of the filter causes the cap to rotate, which then causes rotation of the removable portion.

Typically, the removable portion comprises a plunger. The plunger may have a shaft and a plate. Preferably, the plate has substantially the same shape as a cross-section of the filter chamber taken through the side wall of the filter. Preferably, the plunger is configured such that when the cap is at the first end of the filter, the plate is proximate, or preferably at, the second end of the filter. In this way, the plunger does not substantially interfere with the operation of the centrifugal filter unit to filter the feed. At the end of the filtration operation, the plunger can be removed from the filter chamber and the plate can draw out from the filter chamber at least a portion of the solid material prevented from passing through the perforations. Preferably, the plate is substantially the same shape and size as a cross-section of the filter chamber taken through the side wall of the filter.

The removable portion may comprise an element having substantially the same shape as a cross-section of the filter chamber taken through the side wall of the filter. Preferably, the element of the removable portion having substantially the same shape, is of substantially the same size as a cross-section of the filter chamber taken through the side wall of the filter. For example, there may be a gap of less than about 5 mm, preferably less than about 3 mm, preferably less than about 2 mm, preferably about 1 mm between the element of the removable filter and the side wall.

The removable portion may be shaped to scrape against the side wall during removal of the removable portion from the filter chamber. Thus, increasing the amount of solid material removed from the filter chamber and cleaning the interior side wall of the filter.

The removable portion may comprise a plurality of bristles, wherein the plurality of bristles are arranged on the removable portion proximate the side wall of the filter chamber. For example, the removable portion may comprise an annular arrangement of bristles proximate the side wall. The bristles assist in removal of the solid material from the filter chamber and in cleaning the interior side wall of the filter.

The removable portion may comprise a pliable scraper, wherein the pliable scraper is arranged on the removable portion proximate the side wall of the filter chamber. For example, the removable portion may comprise a pliable scraper proximate the side wall. The pliable scraper assists in removal of the solid material from the filter chamber and in cleaning the interior side wall of the filter. Typically, the pliable scraper is silicon rubber.

The plurality of bristles and pliable scraper may accommodate variations in the cross-section of the filter chamber. In particular, the plurality of bristles and pliable scraper may assist in cleaning the interior wide wall of the filter when the filter chamber does not have a uniform cross-section along its length, for example, where the filter chamber is conical in shape.

The removable portion may comprise the cap. In this way, the solid material can be removed from the centrifugal filter unit in a straightforward manner, simply by removal of the cap. For example, an operator can grip the cap and pull the cap away from the centrifugal filter unit, thus simultaneously removing from the centrifugal filter unit the removable portion and the solid material that has been collected.

The centrifugal filter unit may further comprise an impeller wherein the impeller is comprised in the filter chamber. The impeller may be as described hereinabove in relation to the first aspect. Typically, the impeller is coupled to the filter such that the impeller rotates at the same speed as the filter.

The presence of a rotating filter effects centrifugal filtration of the feed. Furthermore, by having an impeller inside the filter chamber, centrifugal filtration is improved because the impeller increases the force by which liquid is expelled through the filter. In particular, the presence of the impeller improves filtration because expulsion of liquid through the filter is ameliorated even when filtered solid material builds up on the inside surface of the filter in the filter chamber. In this way, effective filtration of treatment formulation can take place for a longer duration without the need to clean the filter.

Typically, the centrifugal filter unit is configured such that when the impeller rotates, the feed is drawn in to the filter chamber through the inlet and liquid is expelled through the perforations. In this way, centrifugal filtration is improved because the impeller increases the force by which liquid is expelled through the filter. In particular, the presence of the impeller improves filtration because it assists expulsion of liquid through the filter even when filtered solid material builds up on the inside surface of the filter in the filter chamber. In this way, effective filtration of treatment formulation can take place for a longer duration without the need to clean the filter.

A further advantage of the centrifugal filter unit comprising an impeller in the filter chamber is that it is able to function as a combined filter and pump. Depending on the arrangement of the apparatus in which the centrifugal filter unit is used, the centrifugal filter unit may be able to function as the only pump in the apparatus. For example, where the centrifugal filter unit is comprised in a recirculation means of an apparatus, the centrifugal filter unit may obviate the need for the recirculation means to comprise a separate pump. Being able to dispense with a separate pump may mean that the centrifugal filter unit may be more readily accommodated in an apparatus. Preferably, the lid is configured to completely seal the first end of the housing such that the first end of the housing is air-tight as well as water-tight. In this way, further improved pumping can be achieved.

Typically, the removable portion may comprise the impeller. Where the removable portion comprises the impeller, the impeller is preferably shaped such that it includes a portion that is substantially the same shape as a cross-section of the filter chamber taken through the side wall of the filter, and preferably being substantially the same size as a cross-section of the filter chamber taken through the side wall of the filter. Preferably, the removable portion comprises the impeller and the cap. In this way, the solid material can be removed from the centrifugal filter unit in a straightforward manner, simply by removal of the cap. For example, an operator can hold the cap and pull the cap away from the centrifugal filter unit, thus simultaneously removing from the centrifugal filter unit the removable portion, including the impeller, and the solid material that has been collected.

Where the filter comprises an outer cage and an inner cage, there may be an attachment mechanism between the inner cage and the removable portion. In this way, the removable portion and the inner cage may be removed from the centrifugal filter unit in a first step and then, after detaching the attachment mechanism, the removable portion may be removed from the inner cage. In this way, the amount of solid material that is able to fall out during removal of the removable portion from the centrifugal filter unit is reduced, as the inner cage functions to substantially contain the solid material.

The removable portion may be simply pulled or slid out of the centrifugal filter unit. Alternatively, the centrifugal filter unit may comprise a retention mechanism or a locking mechanism to secure the removable portion inside the centrifugal filter unit during operation. For example, the removable portion may be detachable from the centrifugal filter unit by undoing clips, or by a twist-lock mechanism.

According to a fifth aspect of the invention, there is provided a centrifugal filter unit for an apparatus, wherein the apparatus is for use in the treatment of a substrate with a treatment formulation, the centrifugal filter unit comprising;
  a) a housing having an outlet configured to allow a filtrate to exit the centrifugal filter unit;
  b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
  c) a lid configured to substantially seal the first end of the housing;
  d) an inlet configured to allow a feed to enter the filter chamber;
  e) a cap at the first end of the filter, wherein the cap comprises an aperture that cooperates with the inlet to allow the feed to enter the filter chamber;
  f) a drive means for rotating the filter; and
  g) an air-release mechanism.

According to a sixth aspect of the invention, there is provided a centrifugal filter unit for an apparatus, wherein the apparatus is for use in the treatment of a substrate with a treatment formulation, the centrifugal filter unit comprising;
  a) a housing having an outlet configured to allow a filtrate to exit the centrifugal filter unit;
  b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
  c) an inlet configured to allow a feed to enter the filter chamber;
  d) a cap at the first end of the filter, wherein the cap comprises an aperture that cooperates with the inlet to allow the feed to enter the filter chamber;
  e) a drive means for rotating the filter; and
  f) an air-release mechanism.

Typically, the lid and the cap are separate components. Typically, the air-release mechanism is comprised in the cap. Alternatively, or in addition, the air-release mechanism may be comprised in the lid. Preferably, the air-release mechanism is as described in relation to the first and third aspects, or second and fourth to seventh aspects of the centrifugal filter unit described above.

According to a seventh aspect of the invention, there is provided a centrifugal filter unit for an apparatus, wherein the apparatus is for use in the treatment of a substrate with a treatment formulation, the centrifugal filter unit comprising;
  a) a housing having an outlet configured to allow a filtrate to exit the centrifugal filter unit;
  b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
  c) a lid configured to substantially seal the first end of the housing;
  d) an inlet configured to allow a feed to enter the filter chamber;
  e) a cap at the first end of the filter, wherein the cap comprises an aperture that cooperates with the inlet to allow the feed to enter the filter chamber;
  f) a drive means for rotating the filter; and
  g) a non-contact seal between the lid and the cap.

Typically, the lid and the cap are separate components. Preferably, the non-contact seal is as described above in relation to the first and second aspects of the centrifugal filter unit described above. Preferably, the non-contact seal is a labyrinth seal.

In an eighth aspect of the invention, there is provided an apparatus for treating a substrate with a treatment formulation, said apparatus comprising:
  a) a tub in which a drum is rotatably mounted, said drum having side walls and said side walls comprising one or more apertures configured to permit said treatment formulation to exit the drum;

b) an access means moveable between an open position wherein the at least one substrate can be placed in the drum and a closed position wherein the apparatus is substantially sealed;
c) a collector, wherein said collector is located beneath said drum and is configured to collect said treatment formulation that exits the drum;
d) a centrifugal filter unit as disclosed herein; and
e) a first flow pathway between the collector and the inlet of the centrifugal filter unit.

The outlet of the centrifugal filter unit may be fluidly connected to the drum. In this way, liquid that has passed through the filter may be returned to the drum. Alternatively, the outlet of the centrifugal filter unit may be fluidly connected to a drain. Preferably, the apparatus further comprises a control valve configured such that filtrate that exits the outlet of the centrifugal filter unit is selectively recirculated to the drum or sent to a drain.

The apparatus may further comprise a recirculation means for recirculating said treatment formulation from said collector to said drum, wherein the centrifugal filter unit is comprised in the recirculation means. In this way, the centrifugal filter unit filters treatment formulation during its recirculation from the collector to the drum. Typically, the recirculation means comprises a pump and ducting which connects the collector and the drum. Where the apparatus has a centrifugal filter unit that comprises an impeller, the centrifugal filter unit can be configured to effect recirculation of said treatment formulation. In this way, the combined pumping and filtering function of the centrifugal filter unit has an advantage of being able to remove the need for a separate pump in the recirculation means.

The apparatus may comprise a second filter element positioned such that treatment formulation passes through the second filter element prior to entering the inlet of the centrifugal filter unit. The second filter element may be a coarse filter to prevent large pieces or items of solid material from entering the centrifugal filter unit, for example, coins or other items from pockets when washing laundry.

The apparatus is preferably a textile treatment apparatus, more preferably the apparatus is a washing machine.

The apparatus may be configured such that the treating of the substrate with the treatment formulation is able to occur in the presence of solid particulate material. For example, the apparatus may be configured such that the solid particulate material is able to exit the drum through the apertures and is collected in the collector. When configured in this way, preferably the apparatus comprises a recirculation means for recirculating the solid particulate material and said treatment formulation from the collector to the drum.

Typically the recirculation means comprises a pipe or duct between the collector and the drum, the pipe or duct may be described as a "flow pathway pipe".

Preferably, the recirculation means comprises a first pump. The first pump assists in transferring solid particulate material that exits the outlet of the collector back to the drum. For the first pump to operate properly, at least a portion of the treatment formulation in the collector also exits the collector with said solid particulate material and enters the recirculation means, and is thereby recirculated to the drum. Preferably, the recirculation means comprises a separator. The recirculation means separator functions to separate solid particulate material from the treatment formulation that has been recirculated from the collector so that substantially only solid particulate material re-enters the drum. Preferably, the recirculation means separator is mounted in the access means of the apparatus. Alternatively, the recirculation means separator is preferably mounted above the access means.

Treatment formulation that is separated by the recirculation means separator is preferably directed back to the collector. The treatment formulation may be returned to the collector via a drain in the access means. Alternatively, the treatment formulation may be returned to the collector via a pipe, wherein the pipe does not pass through the access means.

Where the apparatus comprises recirculation means for recirculating solid particulate material, the centrifugal filter unit is preferably positioned in the recirculation means between the separator and the collector, such that treatment formulation that is separated by the recirculation means separator enters the centrifugal filter unit via the inlet of the centrifugal filter unit. Filtered treatment formulation that exits the outlet of the centrifugal filter unit is directed to the collector. In this way, at least a portion of residual solid material that has passed through the recirculation means separator can be removed from the treatment formulation by the centrifugal filter unit. Preferably, substantially all residual solid material in the treatment formulation is removed by the centrifugal filter unit. Repeated recirculation of treatment formulation through the centrifugal filter unit can result in "polishing" of the treatment formulation.

Alternatively, where the apparatus comprises recirculation means for recirculating solid particulate material, the centrifugal filter unit may be positioned between the collector and a drain. In this way, at least a portion of residual solid material in the treatment formulation is removed before disposal of the treatment formulation. Thus, reducing the amount of solid material entering the drain.

In an alternative arrangement of the apparatus, in which the apparatus is configured such that the treating of the substrate with the treatment formulation is able to occur in the presence of solid particulate material, solid particulate material is unable to exit the drum through the apertures. Where the solid particulate material is unable to exit the drum through the apertures, the apparatus preferably comprises an in-drum storage for the solid particulate material.

Typically, said in-drum storage comprises at least one compartment comprising a flow path facilitating ingress and egress of fluids and solid particulate material. The storage means may comprise a plurality of said compartments. Said compartment or plurality of compartments may be located on at least one inner surface of said drum. Typically, a plurality of compartments are located, typically at equidistant intervals, on the inner circumferential surface of said drum. Alternatively, or in addition, said plurality of compartments may be located on the inner end surface of said drum.

The in-drum storage may be adapted such that ingress or egress of fluids and solid particulate material may be controlled by the direction of rotation of said drum. Thus, where said in-drum storage comprises at least one compartment comprising a flow path facilitating ingress and egress of fluids and solid particulate material, said ingress and egress is dependent on said direction of rotation.

The in-drum storage may comprise a plurality of compartments located at equidistant intervals on the inner circumferential surface of said drum. Typically the drum may comprise from 3 to 10, preferably 4, of the compartments and these compartments may additionally function as, or form part of, a plurality of "lifters". Lifters encourage circulation and agitation of the contents of the drum, that is, the substrate, treatment formulation and solid particulate material, within the drum during rotation of the drum. In this way, the lifters are adapted to store said solid particulate material and to facilitate controlled flow of solid particulate material between said lifter/in-drum storage and the inside of the drum. Typically, the in-drum storage is a compartment of essentially equal length to said lifter, and is adapted so as to provide a flow path from the compartment through an aperture in said lifter to the inside of said drum. Thus, in operation, for a given direction of rotation of said drum, particulate material present on the inner surface of said drum enters the lifters through the aperture and transports to the compartment housed therein via the flow path. For the opposite direction of rotation of said drum, particulate material exits the compartment via the same pathway and enters the drum. The dimensions of the apertures are selected in line with the dimensions of the solid particulate material, so as to allow efficient ingress and egress thereof.

Alternatively, the in-drum storage may be located on the inner end surface of said drum. The in-drum storage typically comprises compartments arranged in a circular array about the central axis of said drum and each compartment has a relatively large cross sectional area and small overall depth, such that the arrangement of compartments does not significantly adversely impact the internal volume of the drum.

In operation, during a typical cycle for cleaning of a soiled substrate in an apparatus wherein said in-drum storage is comprised in said lifters, a substrate is first placed into said drum. The appropriate mass of solid particulate material is contained within said in-drum storage before commencement of the treating cycle. Then, the necessary amount of treatment formulation is added to said drum via a delivery means or an addition port. Then the drum commences rotation in a pre-determined direction. Thus, by means of drum rotation and gravity, solid particulate material moves relative to said in-drum storage such that, for each rotation of said cylindrical cage, a volume of solid particulate material is dispensed from said in-drum storage into the drum until the in-drum storage has been emptied. Thereafter, the direction of rotation of the drum is, for the most part, maintained for the duration of the treatment operation. On occasions during said substrate treatment, the direction of rotation of the drum be reversed for short periods of time (typically less than 1 minute), in order to improve substrate treatment, principally by untangling substrates from each other.

Thereafter, on completion of the substrate treatment, rotation of said drum is typically reversed. Thus, by means of drum rotation and gravity, said solid particulate material separates from the substrate and enters the in-drum storage such that, for each rotation of said drum, a volume of solid particulate material is collected from the drum into the in-drum storage. This process continues until such time that all the solid particulate material has been separated from the substrate and collected by said in-drum storage.

Typically, the tub surrounds the drum and the collector. The tub may surround the drum, preferably wherein the tub and the drum are substantially concentric. Preferably, the collector may be formed from part of the tub. Preferably, the walls of the tub are unperforated but have disposed therein one or more inlets and/or one or more outlets suitable for passage of a treatment formulation and/or components of the treatment formulation and/or any solid particulate material used in the treatment into and out of the tub. Thus, the tub is suitably water-tight, permitting ingress and egress of liquid, such as the treatment formulation, only through pipes or ducting components.

Typically, the drum is mounted substantially horizontally in the tub.

The drum has side walls comprising one or more apertures configured to permit said treatment formulation to exit the drum. Optionally, the apertures may be configured to permit solid particulate material to exit the drum. Typically, the side walls of the drum have one or more apertures having a smallest dimension of from about 1 mm to about 20 mm, preferably from about 1 mm to about 15 mm. Typically, the one or more perforations or the one or more apertures may have a diameter of from about 1 mm to about 10 mm, preferably from about 1 mm to about 8 mm, preferably from about 1 mm to about 6 mm.

Where the apparatus is configured for treating a substrate with a treatment formulation and a solid particulate material, preferably, the drum comprises perforated side walls, wherein the side walls comprise perforations that are larger than the largest dimension of the solid particles to allow passage of the solid particles through said perforations. Typically, the perforations have a smallest dimension of from about 1 mm to about 20 mm, preferably from about 1 mm to about 15 mm. Typically, the one or more perforations have a diameter of from about 1 mm to about 10 mm, preferably from about 1 mm to about 8 mm, preferably from about 1 mm to about 6 mm.

Alternatively, where the apparatus is configured for treating a substrate with a treatment formulation and a solid particulate material, the drum may comprise perforated side walls, wherein said perforations comprise holes having a diameter less than that of the particles of the solid particulate material. Typically, said holes have a diameter no greater than 5.0 mm. Thus, said perforations permit the ingress and egress of the treatment formulation and fine particulate materials of lesser diameter than the holes, but are adapted so as to prevent the egress of solid particulate material having a particle diameter greater than 5.0 mm. Preferably, said perforations comprise holes having a diameter of less than 5.0 mm, most typically less than 3.0 mm. In this way, ingress and egress of all solid particulate material is typically prevented.

The inner surface of the side walls of the drum may comprise a multiplicity of spaced apart elongated protrusions affixed essentially perpendicularly to the inner surface. Typically the drum may comprise from 3 to 10, preferably 4, of the protrusions, which are commonly referred to as "lifters". These lifters encourage circulation and agitation of the contents, that is, the substrate(s) and treatment formulation, within the drum during rotation of the drum.

Where the apparatus is configured to handle solid particulate material, the one or more lifters may comprise one or more apertures providing an alternative route for transfer of the solid particles out of the drum. The lifters may be adapted to collect solid particulate material from within the drum and transfer it to the collector. Lifters may comprise collecting and transferring means in the form of a plurality of compartments. The lifters may be located at equidistant intervals on the inner circumferential surface of the drum. The lifters may comprise a first aperture allowing ingress of the solid particles into the lifter and a second aperture allowing transfer of the solid particles into the collector. Optionally, the lifter may comprise a capturing compartment between the first aperture and the second aperture. The dimensions of the apertures may be selected in line with the dimensions of the solid particles, so as to allow efficient ingress and transfer thereof. The one or more apertures are preferably larger than the largest dimension of the solid particles. Typically, the one of more apertures of the lifters have a smallest dimension of from about 1 mm to about 20 mm, preferably from about 1 mm to about 15 mm. Typically, the one or more apertures may have a diameter of from about 1 mm to about 10 mm, preferably from about 1 mm to about 8 mm, preferably from about 1 mm to about 6 mm.

Alternatively, where the apparatus comprises in-drum storage as hereinbefore defined in which said in-drum storage comprises a plurality of compartments located at equidistant intervals on the inner circumferential surface of said drum, said plurality of compartments may additionally function as a plurality of lifters.

The apparatus is preferably a front-loading apparatus, with the access means disposed in the front of the apparatus. Preferably the access means is or comprises a door. It will be appreciated that, suitably, the drum has an opening aligned with the access means, through which opening said substrates are introduced into said drum.

The drum is preferably cylindrical, but other configurations are also envisaged, including for instance hexagonal drums. The inner surface of the drum is preferably a cylindrical inner surface.

Where the treating of the substrate includes treating with solid particulate material, the solid particulate material preferably comprises a multiplicity of particles. Typically, the number of particles is no less than 1000, more typically no less than 10,000, even more typically no less than 100,000. A large number of particles is particularly advantageous in preventing creasing and/or for improving the uniformity of treating or cleaning of the substrate, particularly wherein the substrate is a textile.

Preferably, the particles have an average mass of from about 1 mg to about 1000 mg, or from about 1 mg to about 700 mg, or from about 1 mg to about 500 mg, or from about 1 mg to about 300 mg, preferably at least about 10 mg, per particle. In one preferred embodiment, the particles preferably have an average mass of from about 1 mg to about 150 mg, or from about 1 mg to about 70 mg, or from about 1 mg to about 50 mg, or from about 1 mg to about 35 mg, or from about 10 mg to about 30 mg, or from about 12 mg to about 25 mg. In an alternative embodiment, the particles preferably have an average mass of from about 10 mg to about 800 mg, or from about 20 mg to about 700 mg, or from about 50 mg to about 700 mg, or from about 70 mg to about 600 mg from about 20 mg to about 600 mg. In one preferred embodiment, the particles have an average mass of about 25 to about 150 mg, preferably from about 40 to about 80 mg. In a further preferred embodiment, the particles have an average mass of from about 150 to about 500 mg, preferably from about 150 to about 300 mg.

The average volume of the particles is preferably in the range of from about 5 to about 500 mm$^3$, from about 5 to about 275 mm$^3$, from about 8 to about 140 mm$^3$, or from about 10 to about 120 mm$^3$, or at least 40 mm$^3$, for instance from about 40 to about 500 mm$^3$, or from about 40 to about 275 mm$^3$, per particle.

The average surface area of the particles is preferably from 10 mm$^2$ to 500 mm$^2$ per particle, preferably from 10 mm$^2$ to 400 mm$^2$, more preferably from 40 to 200 mm$^2$ and especially from 50 to 190 mm$^2$.

The particles preferably have an average particle size of at least 1 mm, preferably at least 2 mm, preferably at least 3 mm, preferably at least 4 mm, and preferably at least 5 mm. The particles preferably have an average particle size no more than 100 mm, preferably no more than 70 mm, preferably no more than 50 mm, preferably no more than 40 mm, preferably no more than 30 mm, preferably no more than 20 mm, preferably no more than 10 mm, and optionally no more than 7 mm. Preferably, the particles have an average particle size of from 1 to 20 mm, more preferably from 1 to 10 mm. Particles which offer an especially prolonged effectiveness over a number of treatment cycles are those with an average particle size of at least 5 mm, preferably from 5 to 10 mm. The size is preferably the largest linear dimension (length). For a sphere this equates to the diameter. For non-spheres this corresponds to the longest linear dimension. The size is preferably determined using Vernier calipers. The average particle size is preferably a number average. The determination of the average particle size is preferably performed by measuring the particle size of at least 10, more preferably at least 100 particles and especially at least 1000 particles. The above mentioned particle sizes provide especially good performance (particularly cleaning performance) whilst also permitting the particles to be readily separable from the substrate at the end of the treatment method.

The particles preferably have an average particle density of greater than 1 g/cm$^3$, more preferably greater than 1.1 g/cm$^3$, more preferably greater than 1.2 g/cm$^3$, even more preferably at least 1.25 g/cm$^3$ and especially preferably greater than 1.3 g/cm$^3$. The particles preferably have an average particle density of no more than 3 g/cm$^3$ and especially no more than 2.5 g/cm$^3$. Preferably, the particles have an average density of from 1.2 to 3 g/cm$^3$. These densities are advantageous for further improving the degree of mechanical action which assists in the treatment process and which can assist in permitting better separation of the particles from the substrate after the treatment.

The particles of the solid particulate material may be polymeric and/or non-polymeric particles. Suitable non-polymeric particles may be selected from metal, alloy, ceramic and glass particles. Preferably, however, the particles of the solid particulate material are polymeric particles.

Preferably the particles comprise a thermoplastic polymer. A thermoplastic polymer, as used herein, preferably means a material which becomes soft when heated and hard when cooled. This is to be distinguished from thermosets (e.g. rubbers) which will not soften on heating. A more preferred thermoplastic is one which can be used in hot melt compounding and extrusion.

The polymer preferably has a solubility in water of no more than 1 wt %, more preferably no more than 0.1 wt % in water and most preferably the polymer is insoluble in water. Preferably the water is at pH 7 and a temperature of 20° C. whilst the solubility test is being performed. The solubility test is preferably performed over a period of 24 hours. The polymer is preferably not degradable. By the words "not degradable" it is preferably meant that the polymer is stable in water without showing any appreciable tendency to dissolve or hydrolyse. For example, the polymer shows no appreciable tendency to dissolve or hydrolyse over a period of 24 hrs in water at pH 7 and at a temperature of 20° C. Preferably a polymer shows no appreciable tendency to dissolve or hydrolyse if no more than about 1 wt %, preferably no more than about 0.1 wt % and preferably none of the polymer dissolves or hydrolyses, preferably under the conditions defined above.

The polymer may be crystalline or amorphous or a mixture thereof.

The polymer can be linear, branched or partly cross-linked (preferably wherein the polymer is still thermoplastic in nature), more preferably the polymer is linear.

The polymer preferably is or comprises a polyalkylene, a polyamide, a polyester or a polyurethane and copolymers and/or blends thereof, preferably from polyalkylenes, polyamides and polyesters, preferably from polyamides and polyalkylene, and preferably from polyamides.

A preferred polyalkylene is polypropylene.

A preferred polyamide is or comprises an aliphatic or aromatic polyamide, more preferably an aliphatic polyamide. Preferred polyamides are those comprising aliphatic chains, especially $C_4$-$C_{16}$, $C_4$-$C_{12}$ and $C_4$-$C_{10}$ aliphatic chains. Preferred polyamides are or comprise Nylons. Preferred Nylons include Nylon 4,6, Nylon 4,10, Nylon 5, Nylon 5,10, Nylon 6, Nylon 6,6, Nylon 6/6,6, Nylon 6,6/6,10, Nylon 6,10, Nylon 6,12, Nylon 7, Nylon 9, Nylon 10, Nylon 10,10, Nylon 11, Nylon 12, Nylon 12,12 and copolymers or blends thereof. Of these, Nylon 6, Nylon 6,6 and Nylon 6,10, and particularly Nylon 6 and Nylon 6,6, and copolymers or blends thereof are preferred. It will be appreciated that these Nylon grades of polyamides are not degradable, wherein the word degradable is preferably as defined above.

Suitable polyesters may be aliphatic or aromatic, and preferably derived from an aromatic dicarboxylic acid and a $C_1$-$C_6$, preferably $C_2$-$C_4$ aliphatic diol. Preferably, the aromatic dicarboxylic acid is selected from terephthalic acid, isophthalic acid, phthalic acid, 1,4-, 2,5-, 2,6- and 2,7-naphthalenedicarboxylic acid, and is preferably terephthalic acid or 2,6-naphthalenedicarboxylic acid, and is most preferably terephthalic acid. The aliphatic diol is preferably ethylene glycol or 1,4-butanediol. Preferred polyesters are selected from polyethylene terephthalate and polybutylene terephthalate. Useful polyesters can have a molecular weight corresponding to an intrinsic viscosity measurement in the range of from about 0.3 to about 1.5 dl/g, as measured by a solution technique such as ASTM D-4603.

Preferably, polymeric particles comprise a filler, preferably an inorganic filler, suitably an inorganic mineral filler in particulate form, such as $BaSO_4$. The filler is preferably present in the particle in an amount of at least 5 wt %, more preferably at least 10 wt %, even more preferably at least 20 wt %, yet more preferably at least 30 wt % and especially at least 40 wt % relative to the total weight of the particle. The filler is typically present in the particle in an amount of no more than 90 wt %, more preferably no more than 85 wt %, even more preferably no more than 80 wt %, yet more preferably no more than 75 wt %, especially no more than 70 wt %, more especially no more than 65 wt % and most especially no more than 60 wt % relative to the total weight of the particle. The weight percentage of filler is preferably established by ashing. Preferred ashing methods include ASTM D2584, D5630 and ISO 3451, and preferably the test method is conducted according to ASTM D5630. For any standards referred to in the present invention, unless specified otherwise, the definitive version of the standard is the most recent version which precedes the priority filing date of this patent application. Preferably, the matrix of said polymer optionally comprising filler(s) and/or other additives extends throughout the whole volume of the particles.

The particles can be spheroidal or substantially spherical, ellipsoidal, cylindrical or cuboid. Particles having shapes which are intermediate between these shapes are also possible. The best results for treatment performance (particularly cleaning performance) and separation performance (separating the substrate from the particles after the treating steps) in combination are typically observed with ellipsoidal particles. Spheroidal particles tend to separate best but may not provide optimum treatment or cleaning performance. Conversely, cylindrical or cuboid particles separate poorly but treat or clean effectively. Spherical and ellipsoidal particles are particularly useful where improved fabric care is important because they are less abrasive. Spheroidal or ellipsoidal particles are particularly useful in the present invention which is designed to operate without a particle pump and wherein the transfer of the particles between the storage means and the interior of the drum is facilitated by rotation of the drum.

The term "spheroidal", as used herein, encompasses spherical and substantially spherical particles. Preferably, the particles are not perfectly spherical. Preferably, the particles have an average aspect ratio of greater than 1, more preferably greater than 1.05, even more preferably greater than 1.07 and especially greater than 1.1. Preferably, the particles have an average aspect ratio of less than 5, preferably less than 3, preferably less than 2, preferably less than 1.7 and preferably less than 1.5. The average is preferably a number average. The average is preferably performed on at least 10, more preferably at least 100 particles and especially at least 1000 particles. The aspect ratio for each particle is preferably given by the ratio of the longest linear dimension divided by the shortest linear dimension. This is preferably measured using Vernier Calipers. Where a good balance between treating performance (particularly cleaning performance) and substrate care is required, it is preferred that the average aspect ratio is within the abovementioned values. When the particles have a very low aspect ratio (e.g. highly spherical particles), the particles may not provide sufficient mechanical action for good treating or cleaning characteristics. When the particles have an aspect ratio which is too high, the removal of the particles from the substrate may become more difficult and/or the abrasion on the substrate may become too high, which may lead to unwanted damage to the substrate, particularly wherein the substrate is a textile.

According to a ninth aspect of the invention, there is provided a method of filtering treatment formulation in an apparatus as disclosed herein, comprising operating the drive means to rotate the filter of the centrifugal filter unit as defined herein at a first speed and transferring treatment formulation from the collector to the inlet of the centrifugal filter unit, wherein at least a portion of liquid from the treatment formulation passes through the filter and at least a portion of solid material from the treatment formulation is prevented from passing through the filter.

The method of filtering treatment formulation may occur once treatment of a substrate has finished, that is, at the end of a treatment cycle. An advantage of carrying out the method in this way is that the treatment formulation need only be fed to the inlet of the centrifugal filter unit at the end of the treatment cycle and so this provides more freedom about location of the centrifugal filter unit in the apparatus.

Alternatively, the method of filtering treatment formulation may occur during the treatment of a substrate. The method of filtering may be continuous during treatment of the substrate or may occur intermittently, for example, in pulses. Where the method of filtering occurs in pulses, filtration efficiency of the centrifugal filter unit may be higher than when the method is carried out continuously, that is, more solid material is typically prevented from passing through the filter. However, carrying out the method of filtering continuously during treatment of the substrate may be advantageous in that the treatment formulation is continuously cleaned and so the treatment formulation may result in improved and/or more efficient treatment of the substrate, particularly in that there may be reduced deposition onto the substrate of solid material such as fibres from the treatment formulation.

Preferably, the centrifugal filter unit of the apparatus used in the method comprises an impeller in the filter chamber. As such, the centrifugal filter unit functions as a combined filter and pump. In this way, the transferring of treatment formulation from the collector to the inlet of the centrifugal filter unit may be effected by the impeller.

The method may further comprise the step of transferring to the drum the filtrate that exits the outlet of the housing of the centrifugal filter unit. Preferably, the method comprises repeatedly cycling treatment formulation from the collector to the drum through the centrifugal filter unit in the absence of a substrate in the drum. In this way, the centrifugal filter unit can "polish" the treatment formulation, that is, the amount of solid material remaining in the treatment formulation can be reduced compared to a single filtration of the treatment formulation.

Alternatively, or in addition, the apparatus may comprise one or more valves that allows the filtrate that exits the outlet of the housing of the centrifugal filter unit to be optionally transferred back to the collector rather than to the drum. As such, alternatively or in addition, the method may further comprise a step of transferring to the collector the filtrate that exits the outlet of the housing of the centrifugal filter unit. Preferably, the method comprises repeatedly cycling treatment formulation from the collector to the centrifugal filter unit and back to the collector. In this case, during the cycling, the treatment formulation does not pass through the drum and/or the treatment formulation does not contact the substrate. In this way, the centrifugal filter unit can "polish" the treatment formulation irrespective of whether there is a substrate in the drum. This arrangement may be particularly useful where the apparatus releases to drain portions of the treatment formulation during a treatment cycle.

Alternatively or in addition, the method may further comprise the step of transferring to a drain the filtrate that exits the outlet of the housing of the centrifugal filter unit.

The method may further comprise a step of operating the drive means to increase the speed of rotation of the filter from the first speed to a second speed that is higher than the first speed in order to dewater the solid material collected in the filter chamber.

The method may further comprise the step of opening the lid of the centrifugal filter unit and extracting solid material collected in the filter chamber.

According to a tenth aspect of the invention, there is provided a method of treating a substrate comprising treating the substrate with a treatment formulation using the apparatus of the present invention, as described herein. Preferably, the method comprises the steps of:
(a) loading the at least one substrate into the drum and closing the access means;
(b) introducing treatment formulation to the drum;
(c) rotating the drum;
(d) collecting in the collector treatment formulation that exits the drum; and
(e) operating pumping means to pump the treatment formulation from the collector to the centrifugal filter unit and to pump the filtrate from the centrifugal filter unit back to the drum or to a drain.

Preferably, the pumping means comprises an impeller in the filter chamber of the centrifugal filter unit. Preferably, the access means is or comprises a door.

Preferably, the method of treating a substrate further comprises introducing solid particulate material into the drum and agitating the substrate with the solid particulate material. Preferably, the solid particulate material is re-used in further treatment procedures.

The method may comprise the additional step of rinsing the treated substrate. Rinsing is preferably performed by adding a rinsing liquid medium, optionally comprising one or more post-treatment additives, to the treated substrate. The rinsing liquid medium is preferably an aqueous medium, i.e. the rinsing liquid medium is or comprises water. In order of increasing preference, the rinsing liquid medium comprises at least 50 wt %, at least 60 wt %, at least 70 wt %, at least 80 wt %, at least 90 wt %, at least 95 wt % and at least 98 wt % of water. More preferably, the rinsing liquid medium is water.

Preferably, the method is a method for treating multiple batches, wherein a batch comprises at least one substrate, the method comprising agitating a first batch with treatment formulation and solid particulate material, wherein said method further comprises the steps of:
(a) collecting said solid particulate material in the storage means;
(b) agitating a second batch comprising at least one substrate with solid particulate material collected from step (a); and
(c) optionally repeating steps (a) and (b) for subsequent batch(es) comprising at least one substrate.

The treatment procedure of an individual batch typically comprises the steps of agitating the batch with said solid particulate material in an apparatus for a treatment cycle. A treatment cycle typically comprises one or more discrete treatment step(s), optionally one or more rinsing step(s), optionally one or more step(s) of separating the particles from the treated batch, optionally one or more extraction step(s) of removing treatment formulation from the treated batch, optionally one or more drying step(s), and optionally the step of removing the treated batch from the apparatus.

In the method of the present invention, steps (a) and (b) may be repeated at least 1 time, preferably at least 2 times, preferably at least 3 times, preferably at least 5 times, preferably at least 10 times, preferably at least 20 times, preferably at least 50 times, preferably at least 100 times, preferably at least 200 times, preferably at least 300 times, preferably at least 400 at least or preferably at least 500 times.

As used herein, the "substrate" may be or comprise a textile and/or an animal skin substrate. In a preferred embodiment, the substrate is or comprises a textile. The textile may be in the form of an item of clothing such as a coat, jacket, trousers, shirt, skirt, dress, jumper, underwear, hat, scarf, overalls, shorts, swim wear, socks and suits. The textile may also be in the form of a bag, belt, curtains, rug, blanket, sheet or a furniture covering. The textile can also be in the form of a panel, sheet or roll of material which is later used to prepare the finished item or items. The textile can be or comprise a synthetic fibre, a natural fibre or a combination thereof. The textile can comprise a natural fibre which has undergone one or more chemical modifications. Examples of natural fibres include hair (e.g. wool), silk and cotton. Examples of synthetic textile fibres include Nylon (e.g. Nylon 6,6), acrylic, polyester and blends thereof. As used herein, the term "animal skin substrate" includes skins, hides, pelts, leather and fleeces. Typically, the animal skin substrate is a hide or a pelt. The hide or pelt may be a processed or unprocessed animal skin substrate. Where the substrate is or comprises a synthetic textile fibre, an advantage of the centrifugal filter unit of the present invention is that fewer synthetic fibres are released from the apparatus in which the substrate is being treated. Preferably, substantially all synthetic fibres from the substrate are prevented from being released from the apparatus. Reducing the amount of synthetic fibres derived from the substrate that are released from the apparatus can have a substantial environmental benefit.

The treating of a substrate which is or comprises a textile according to the present invention may be a cleaning process or any other treatment process such as coloration (preferably dyeing), ageing or abrading (for instance stone-washing), bleaching or other finishing process. Stonewashing is a known method for providing textiles having "worn in" or "stonewashed" characteristics such as a faded appearance, a softer feel and a greater degree of flexibility. Stonewashing is frequently practiced with denim. Preferably the treating of a substrate which is or comprises a textile is a cleaning process. The cleaning process may be a domestic or industrial cleaning process.

As used herein, the term "treating" in relation to treating an animal skin substrate is preferably a tannery process, including colouring and tanning and associated tannery processes, preferably selected from curing, beamhouse treatments, pre-tanning, tanning, re-tanning, fat liquoring, enzyme treatment, tawing, crusting, dyeing and dye fixing, preferably wherein said beamhouse treatments are selected from soaking, liming, deliming, reliming, unhairing, fleshing, bating, degreasing, scudding, pickling and depickling. Preferably, said treating of an animal skin substrate is a process used in the production of leather. Preferably, said treating acts to transfer a tanning agent (including a colourant or other agent used in a tannery process) onto or into the animal skin substrate.

The treatment formulation referred to herein may comprise one or more treatment agent(s) which are suitable to effect the desired treating of the substrate.

Thus, a method according to the present invention which is a cleaning process suitably comprises agitating the substrate with a treatment formulation, and optionally solid particulate material, wherein the treatment formulation comprises one or more treatment agents, wherein said treatment formulation is preferably a detergent composition comprising one or more of the following components: surfactants, dye transfer inhibitors, builders, enzymes, metal chelating agents, biocides, solvents, stabilizers, acids, bases and buffers.

Similarly, the treatment formulation of a coloration process preferably comprises one or more dyes, pigments, optical brighteners and mixtures thereof.

The treatment formulation of a stone-washing process may comprise an appropriate stone-washing agent, as known in the art, for instance an enzymatic treatment agent such as a cellulase.

The treatment formulation of a tannery process suitably comprises one or more agent(s) selected from tanning agents, re-tanning agents and tannery process agents. The treatment formulation may comprise one or more colourant(s). The tanning or re-tanning agent is preferably selected from synthetic tanning agents, vegetable tanning or vegetable re-tanning agents and mineral tanning agents such as chromium (III) salts or salts and complexes containing iron, zirconium, aluminium and titanium. Suitable synthetic tanning agents include amino resins, polyacrylates, fluoro and/or silicone polymers and formaldehyde condensation polymers based on phenol, urea, melamine, naphthalene, sulphone, cresol, bisphenol A, naphthol and/or biphenyl ether. Vegetable tanning agents comprise tannins which are typically polyphenols. Vegetable tanning agents can be obtained from plant leaves, roots and especially tree barks. Examples of vegetable tanning agents include the extracts of the tree barks from chestnut, oak, redoul, tanoak, hemlock, quebracho, mangrove, wattle acacia; and myrobalan. Suitable mineral tanning agents comprise chromium compounds, especially chromium salts and complexes, typically in a chromium (III) oxidation state, such as chromium (III) sulphate. Other tanning agents include aldehydes (glyoxal, glutaraldehyde and formaldehyde), phosphonium salts, metal compounds other than chromium (e.g. iron, titanium, zirconium and aluminium compounds). Preferably, the tanning agents are substantially free from chromium-containing compounds.

One or more substrates can be simultaneously treated by the method of the invention. The exact number of substrates will depend on the size of the substrates and the capacity of the apparatus utilized.

The total weight of dry substrates treated at the same time (i.e. in a single batch or washload) may be up to 50,000 kg. For textile substrates, the total weight is typically from 1 to 500 kg, more typically 1 to 300 kg, more typically 1 to 200 kg, more typically from 1 to 100 kg, even more typically from 2 to 50 kg and especially from 2 to 30 kg. For animal substrates, the total weight is normally at least about 50 kg, and can be up to about 50,000 kg, typically from about 500 to about 30,000 kg, from about 1000 kg to about 25,000 kg, from about 2000 to about 20,000 kg, or from about 2500 to about 10,000 kg.

Preferably the treatment formulation is an aqueous medium, i.e. the treatment formulation is or comprises water. In order of increasing preference, the treatment formulation comprises at least 50 wt %, at least 60 wt %, at least 70 wt %, at least 80 wt %, at least 90 wt %, at least 95 wt % and at least 98 wt % of water. The treatment formulation may optionally comprise one or more organic liquids including for example alcohols, glycols, glycol ethers, amides and esters. Preferably, the sum total of all organic liquids present in the treatment formulation is no more than 10 wt %, more preferably no more than 5 wt %, even more preferably no more than 2 wt %, especially no more than 1% and most especially the treatment formulation is substantially free from organic liquids.

The treatment formulation preferably has a pH of from 3 to 13. The pH of the treatment formulation can differ at different times, points or stages in the treatment method according to the invention. It can be desirable to treat (particularly to clean) a substrate under alkaline pH conditions, although while higher pH offers improved performance (particularly cleaning performance) it can be less kind to some substrates. Thus, it can be desirable that the treatment formulation has a pH of from 7 to 13, more preferably from 7 to 12, even more preferably from 8 to 12 and especially from 9 to 12. In a further preferred embodiment, the pH is from 4 to 12, preferably 5 to 10, especially 6 to 9, and most especially 7 to 9, particularly in order to improve fabric care. It may also be desirable that the treating of a substrate, or one or more specific stage(s) of a treatment process, is conducted under acid pH conditions. For instance, certain steps in the treatment of animal skin substrates are advantageously conducted at a pH which is typically less than 6.5, even more typically less than 6 and most typically less than 5.5, and typically no less than 1, more typically no less than 2 and most typically no less than 3. Certain fabric or garment finishing treatment methods, for instance stone-washing, may also utilise one or more acidic stage(s). An acid and/or base may be added in order to obtain the abovementioned pH values. Preferably, the abovementioned pH is maintained for at least a part of the duration, and in some preferred embodiments for all of the duration, of the agitation. In order to prevent the pH of the treatment formulation from drifting during the treatment, a buffer may be used.

Preferably, the weight ratio of the treatment formulation to the dry substrate is no more than 20:1, more preferably no more than 10:1, especially no more than 5:1, more especially no more than 4.5:1 and even more especially no more than 4:1 and most especially no more than 3:1. Preferably, the weight ratio of treatment formulation to the dry substrate is at least 0.1:1, more preferably at least 0.5:1 and especially at least 1:1. In the present invention, it is possible to use surprisingly small amounts of treatment formulation whilst still achieving good treatment performance (particularly cleaning performance), which has environmental benefits in terms of water usage, waste water treatment and the energy required to heat or cool the water to the desired temperature.

More than one type of treatment formulation may be used during the methods of treating a substrate described herein. For example, a treatment formulation consisting of water may be added initially to the substrate in the drum prior to the introduction of solid particulate material. Subsequently, during agitation of the substrate with the solid particulate material, a treatment formulation comprising water and one or more treatment agents may be used.

Where solid particulate material is used in the treating of the substrate, preferably, the ratio of particles to dry substrate is at least 0.1, especially at least 0.5 and more especially at least 1:1 w/w. Preferably, the ratio of particles to dry substrate is no more than 30:1, more preferably no more than 20:1, especially no more than 15:1 and more especially no more than 10:1 w/w. Preferably, the ratio of the particles to dry substrate is from 0.1:1 to 30:1, more preferably from 0.5:1 to 20:1, especially from 1:1 to 15:1 w/w and more especially from 1:1 to 10:1 w/w.

Preferably, the treatment method agitates the substrate in the presence of the solid particulate material. The agitation may be in the form of shaking, stirring, jetting and tumbling. Of these, tumbling is especially preferred. Preferably, the substrate and solid particulate material are introduced into the drum which is rotated so as to cause tumbling. The rotation can be such as to provide a centripetal force of from 0.05 to 1 G and especially from 0.05 to 0.7 G. The centripetal force is preferably as calculated at the interior walls of the drum furthest away from the axis of rotation.

The solid particulate material is able to contact the substrate, suitably mixing with the substrate during the agitation.

The agitation may be continuous or intermittent. Preferably, the method is performed for a period of from 1 minute to 10 hours, more preferably from 5 minutes to 3 hours and even more preferably from 10 minutes to 2 hours.

The treatment method is preferably performed at a temperature of from greater than 0° C. to about 95° C., preferably from 5 to 95° C., preferably at least 10° C., preferably at least 15° C., preferably no more than 90° C., preferably no more than 70° C., and advantageously no more 50° C., no more than 40° C. or no more than 30° C. Such milder temperatures allow the particles to provide the aforementioned benefits over larger numbers of treatment cycles. Preferably, when several batches or washloads are treated or cleaned, every treating or cleaning cycle is performed at no more than a temperature of 95° C., more preferably at no more than 90° C., even more preferably at no more than 80° C., especially at no more than 70° C., more especially at no more than 60° C. and most especially at no more than 50° C., and from greater than 0° C., preferably at least 5° C., preferably at least 10° C., preferably at least 15° C., preferably from greater than 0 to 50° C., greater than 0 to 40° C., or greater than 0 to 30° C., and advantageously from 15 to 50° C., 15 to 40° C. or 15 to 30° C. These lower temperatures again allow the particles to provide the benefits for a larger number of treatment or wash cycles.

It will be appreciated that the duration and temperature conditions described hereinabove are associated with the treating of an individual batch comprising at least one of said substrate(s).

When solid particulate material is used in the treating of the substrate, agitation of the substrates with the solid particulate material suitably takes place in said one or more discrete treating step(s) of the aforementioned treatment cycle. Thus, the duration and temperature conditions described hereinabove are preferably associated with the step of agitating said substrate(s) with solid particulate material, i.e. said one or more discrete treating step(s) of the aforementioned treatment cycle.

Preferably, the method is a method for cleaning a substrate, preferably a laundry cleaning method, preferably a method for cleaning a substrate which is or comprises a textile. Thus, preferably, a batch is a washload. Preferably the washload comprises at least one soiled substrate, preferably wherein the soiled substrate is or comprises a soiled textile. The soil may be in the form of, for example, dust, dirt, foodstuffs, beverages, animal products such as sweat, blood, urine, faeces, plant materials such as grass, and inks and paints. The cleaning procedure of an individual washload typically comprises the steps of agitating the washload with said solid particulate material in a cleaning apparatus for a cleaning cycle. A cleaning cycle typically comprises one or more discrete cleaning step(s) and optionally one or more post-cleaning treatment step(s), optionally one or more rinsing step(s), optionally one or more step(s) of separating the cleaning particles from the cleaned washload, optionally one or more drying step(s), optionally one or more extraction step(s) of removing treatment formulation from the cleaned washload, and optionally the step of removing the cleaned washload from the cleaning apparatus.

Where the method is a cleaning method, the substrate is preferably agitated with said solid particulate material and a treatment formulation, preferably wherein the treatment formulation comprises a detergent composition. The detergent composition may comprise any one or more of the following components: surfactants, dye transfer inhibitors, builders, enzymes, metal chelating agents, biocides, solvents, stabilizers, acids, bases and buffers. In particular, the detergent composition may comprise one or more enzyme(s).

Where the method is a cleaning method, optional post-cleaning additives which may be present in a rinsing liquid medium include optical brightening agents, fragrances and fabric softeners.

The invention is further illustrated with reference to the following figures in which.

Figure 6:
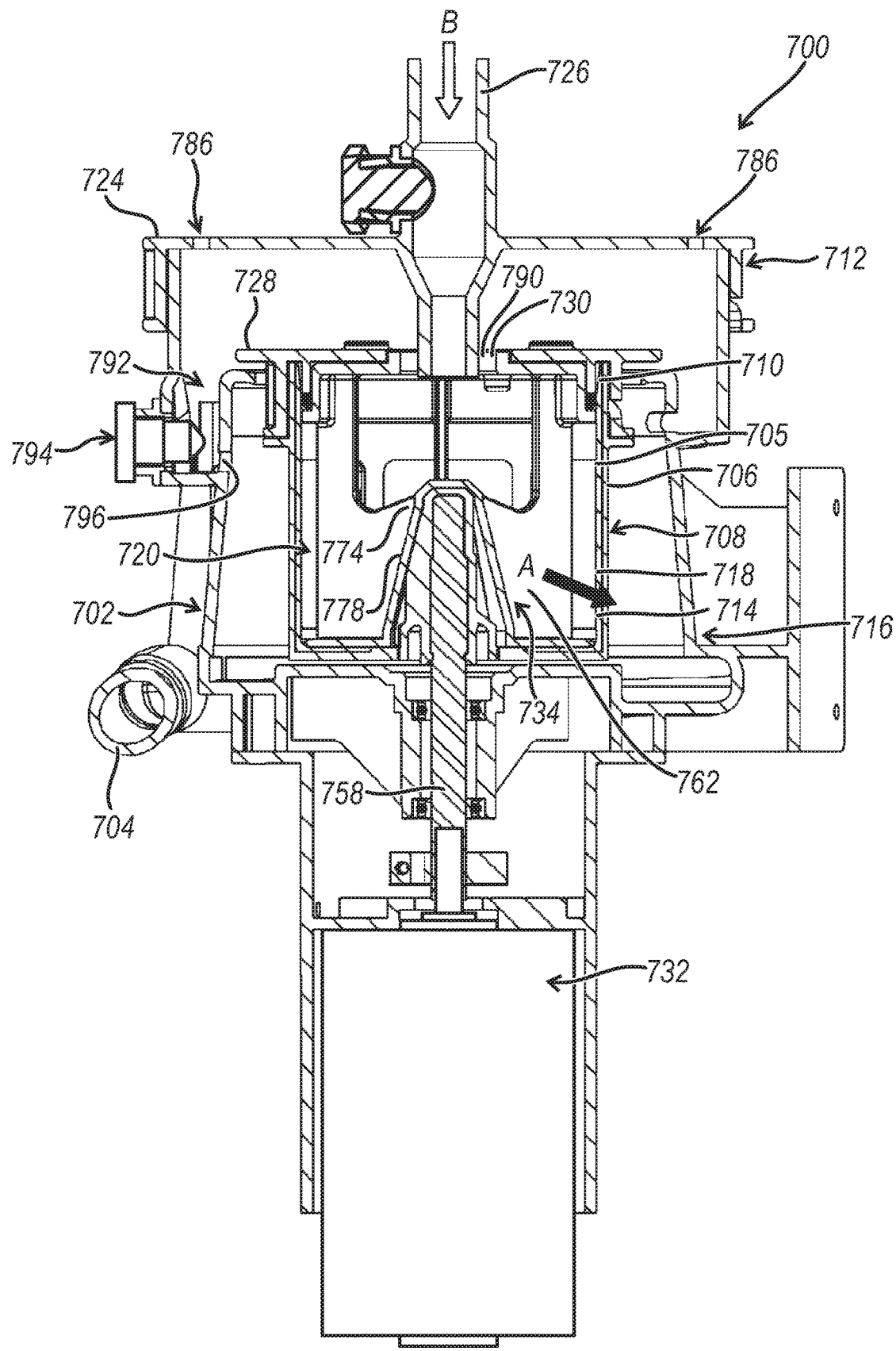
FIG. 6 shows a cross-section view of a further centrifugal filter unit according to the disclosure.
Figure 7:
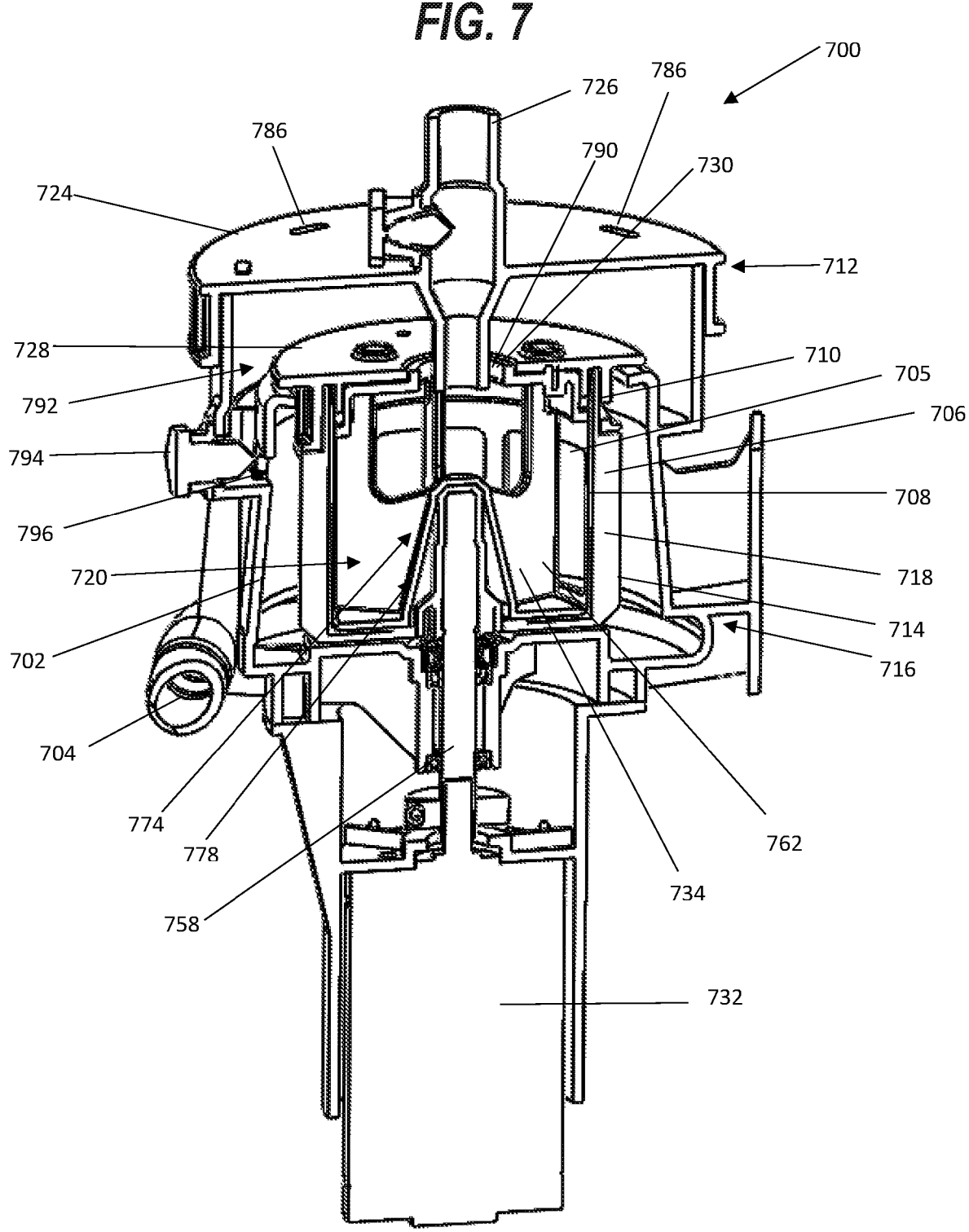
Figure 8A:
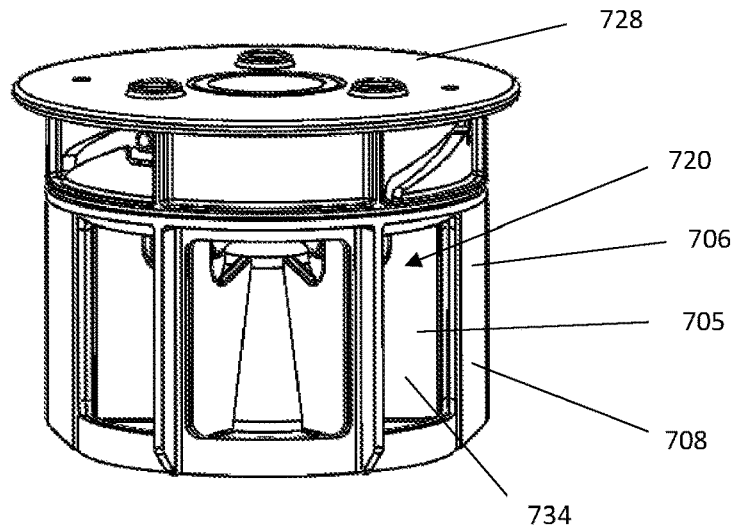
Figure 8B:
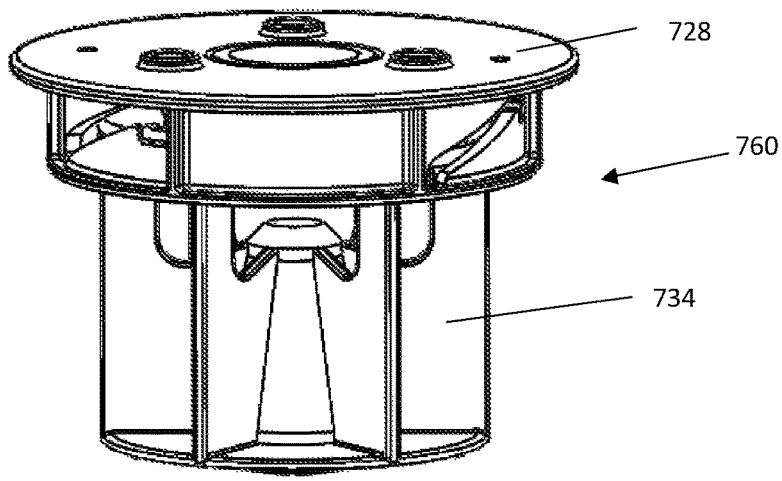
Figure 8C:
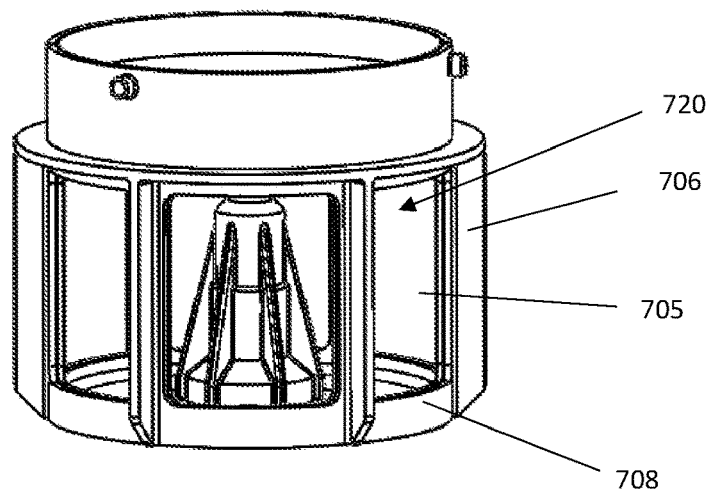
Figure 8D:
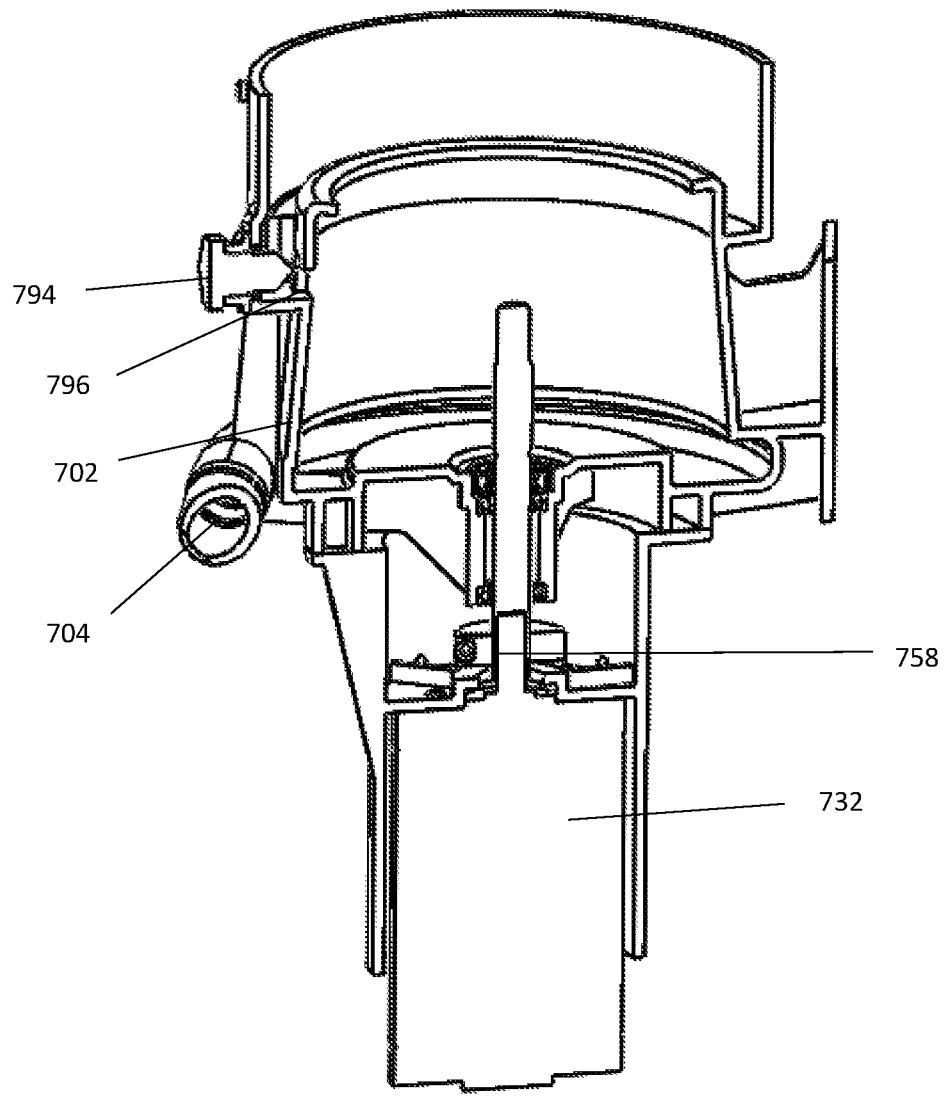

FIG. 7 shows a 3D cross-section view of the centrifugal filter unit of FIG. 6; and FIG. 8 shows a series of components of the centrifugal filter unit: FIG. 8a shows the filter chamber and removable portion of a centrifugal filter unit of FIGS. 6 and 7, FIG. 8b shows the removable portion of the centrifugal filter unit, including the cap and impeller, as removed from the filter chamber, FIG. 8c shows the filter chamber, and FIG. 8d shows the housing with the removable portion and filter chamber removed.

Figure 1:
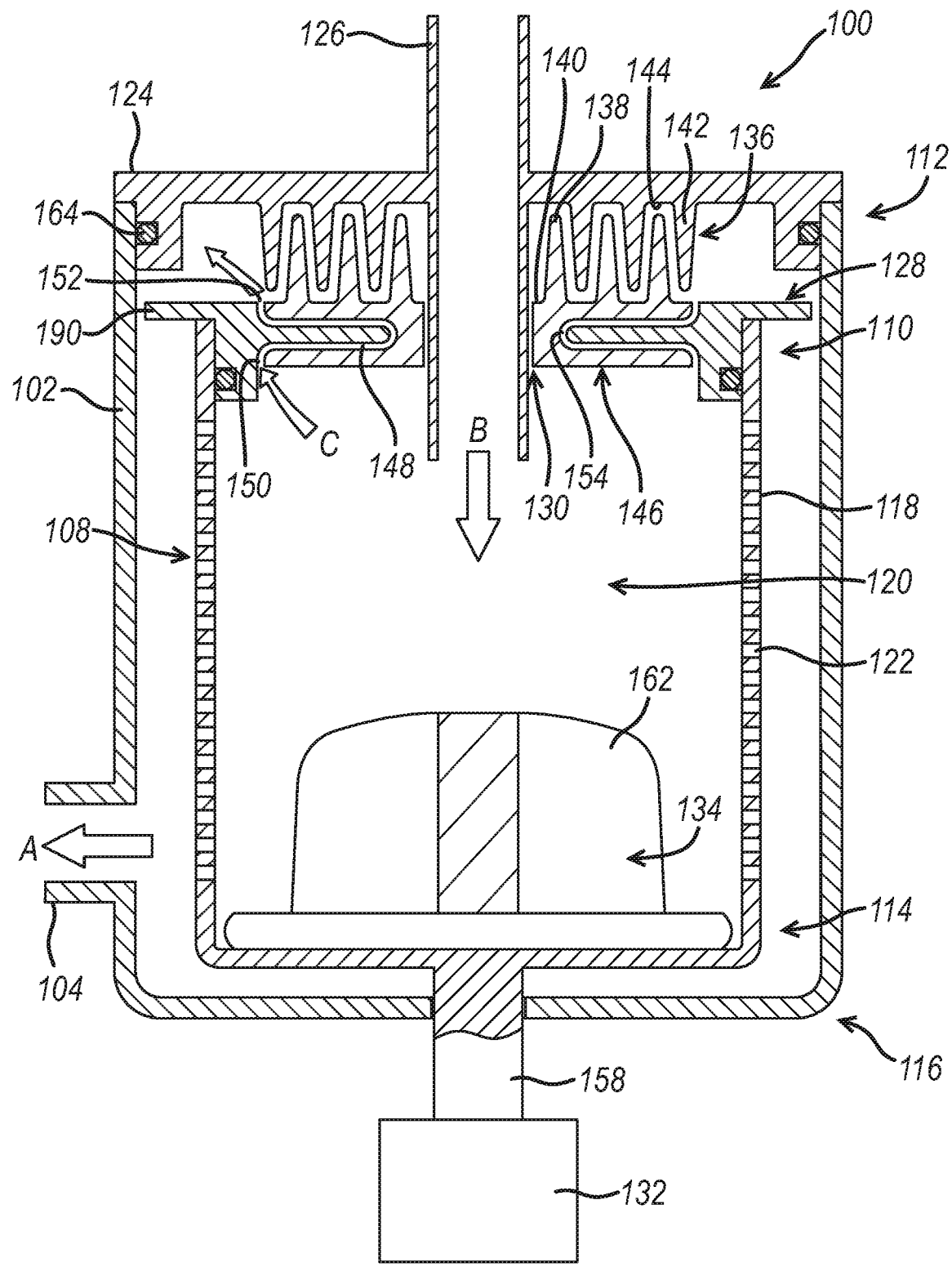
FIG. 1 shows a cross-section view of a centrifugal filter unit according to the disclosure.

FIG. 1 illustrates a centrifugal filter unit (100) according to the present disclosure. The centrifugal filter unit (100) has a housing (102) which has an outlet (104) through which filtered treatment formulation (shown by arrow A) is able to leave the centrifugal filter unit (100). The centrifugal filter unit (100) comprises a filter (108) rotatably mounted in the housing (102). The filter (108) has a first end (110) proximate a first end (112) of the housing (102). The filter has a second end (114) proximate the second end (116) of the housing (102). The filter has a side wall (118) between the first end (110) and the second end (114) having perforations (122). The centrifugal filter unit (100) has a filter chamber (120). A cap (128) is located at the first end (110) of the filter. The cap (128) has an aperture (130) through which there is positioned an inlet (126) formed in a lid (124) but otherwise the cap (128) substantially seals the first end (110) of the filter (108) such that solid material and liquid are substantially prevented from leaving the filter chamber (120) through the first end (110) of the filter (108). The lid (124) substantially seals the first end (112) of the housing (102). The lid (124) comprises an o-ring (164) that cooperates with the housing (102) to seal the first end (112) of the housing (102). Feed (shown by arrow B) is able to enter the filter chamber (120) through the inlet (126).

The centrifugal filter unit (100) comprises a drive means (132) for rotating the filter (108). The drive means (132) has a drive shaft (158) which engages the filter (108). An impeller (134) is coupled to the filter (108) and rotates with the filter (108). The impeller has six blades (162), two of which are shown in FIG. 1. The impeller (134) is located proximate the second end (114) of the filter (108) in order not to interfere with the flow of feed (arrow B) entering through the inlet (126). The cap (128) rotates with the filter (108). The lid (124) does not rotate.

The filter (108) and the housing (102) are both substantially cylindrical.

The cap comprises a first plurality of concentric rings (138) protruding from a side (140) of the cap (128) that faces away from the filter chamber (120). The lid (124) comprises a second plurality of concentric rings (142) protruding from a side (144) of the lid (124) that faces the filter chamber (120). The first plurality of concentric rings (138) are interspersed between the second plurality of concentric rings (142), thereby forming a labyrinth seal (136). Any liquid that leaks out of the filter chamber (120) via the aperture (130) during rotation of the filter (108) has to follow a tortuous path formed by the interposed first plurality of concentric rings (138) and second plurality of concentric rings (142) and, as such, is unable in practice to pass through the labyrinth seal. In this way, contamination of the liquid that has passed through the filter (108) is avoided. A flange (190) extends from the first end (110) of the filter (108) towards the housing (102). The flange prevents feed that has been able to leave the filter chamber (120) via the aperture (130) in the cap (128) and the labyrinth seal (136) from passing from the first end (112) of the housing (102) towards the second end (116) of the housing, thus providing a further protection against contamination of the liquid that has been filtered.

When the filter (108) stops rotating, the path of least resistance for any return flow into the filter chamber (120) of liquid that has passed through the perforations in the filter (108) is back through the perforations (122) in the side wall (118) of the filter (108). Some of the return flow of liquid that has re-entered the filter chamber (120) may exit the filter chamber (120) via the inlet (126).

The cap (128) comprises six air-release mechanisms (146), two of which are shown in FIG. 1. Each air-release mechanism (146) comprises a channel (148) that has a "U-bend" shape. As such, the channel (148) has a first end (150) on the side of the cap (128) facing the filter chamber (120) and a second end (152) on the side of the cap (128) facing the lid (124). A mid-point (154) of the channel (148) is positioned at a distance closer to the axis of rotation of the filter (108) than the distance from the axis of rotation of the filter of the first end (150) and the second end (152). Air in can be released from the filter chamber (120) through the channel (148) (arrow C). The positions of the first end (150) and the second end (152) are shown in FIG. 1 at the same distance from the axis of rotation of the filter (108). However, the position of the first end (150) and the second end (152) can be varied in order to create an in-flow or out-flow though the labyrinth. Preferably, the second end (152) is closer to the axis of rotation than the first end (150) as this provides an in-flow which helps keep the labyrinth seal clean and free of contaminant solid material.

Rotation of the filter (108) and the impeller (134) has a pumping effect that causes the feed (arrow B) to be drawn in to the filter chamber (120) via the axial inlet (126), The rotation of the filter (108) and the impeller (134) causes the feed to travel in a radial direction towards the filter side wall (118). Solid material in the feed is retained within the filter chamber (120) at the side wall (118) of the filter whereas liquid passes through the perforations (122) of the filter (108) and leaves the centrifugal filter unit (100) via the radial outlet (104) in the housing (102).

Figure 2:
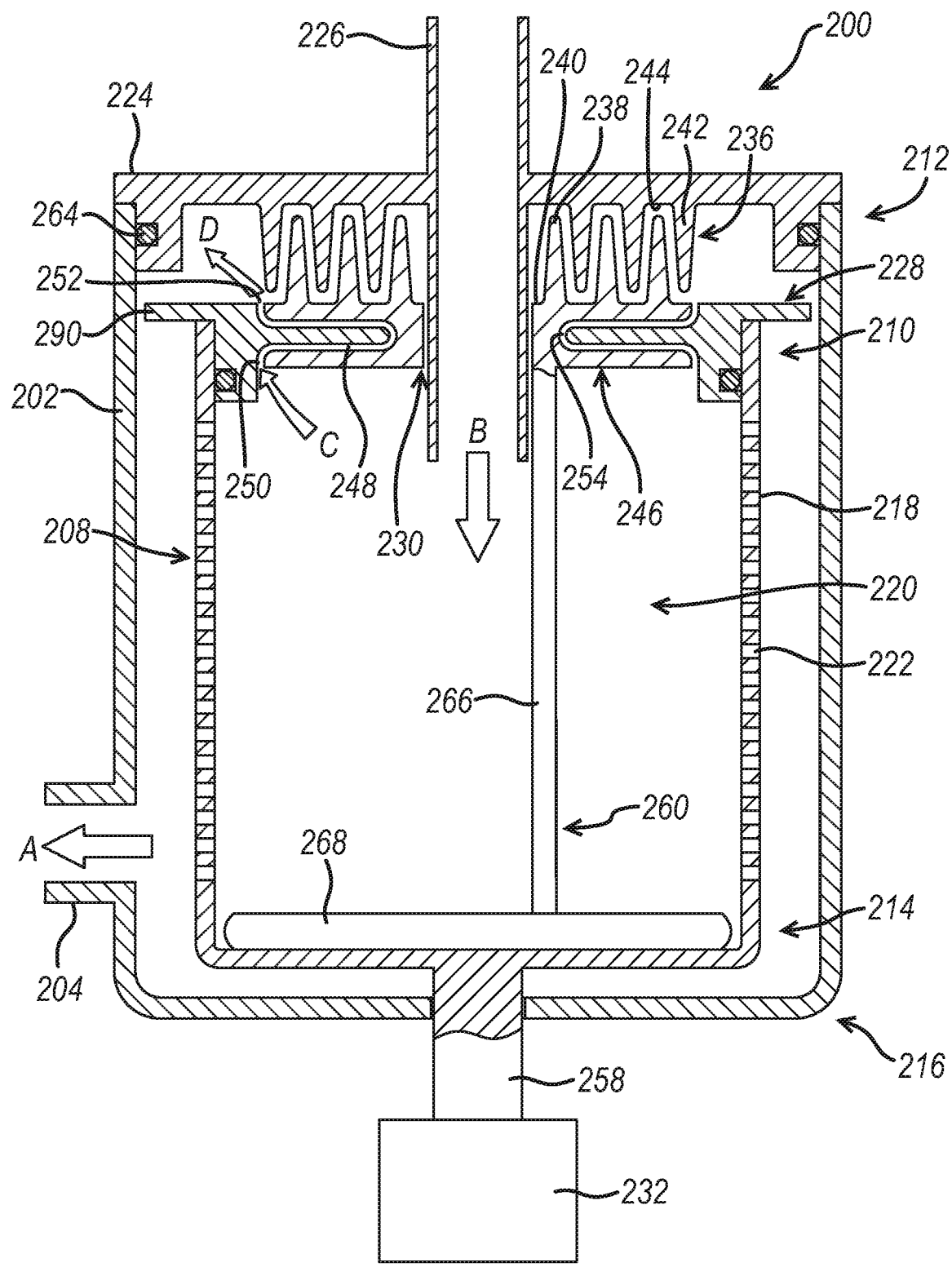
FIG. 2 shows a cross-sectional view of an alternative centrifugal filter unit according to the disclosure.

FIG. 2 illustrates a further centrifugal filter unit (200) according to the present disclosure. The centrifugal filter unit (200) has a housing (202) which has an outlet (204) through which filtered treatment formulation (shown by arrow A) is able to leave the centrifugal filter unit (200). The centrifugal filter unit (200) comprises a filter (208) rotatably mounted in the housing (202). The filter (208) has a first end (210) proximate a first end (212) of the housing (202). The filter has a second end (214) proximate the second end (216) of the housing (202). The filter has a side wall (218) between the first end (210) and the second end (214) having perforations (222). The centrifugal filter unit (200) has a filter chamber (220). A cap (228) is located at the first end (210) of the filter (208). The cap (228) has an aperture (230) through which there is positioned an inlet (226) formed in a lid (224) but otherwise the cap (228) substantially seals the first end (210) of the filter (208) such that solid material and liquid are substantially prevented from leaving the filter chamber (220) through the first end (210) of the filter (208). The lid (224) substantially seals the first end (212) of the housing (202). The lid (224) comprises an o-ring (264) that cooperates with the housing (202) to seal the first end (212) of the housing (202). Feed (shown by arrow B) is able to enter the filter chamber (220) through the inlet (226).

The centrifugal filter unit (200) comprises a drive means (232) for rotating the filter (208). The drive means (232) has a drive shaft (258) which engages the filter (208).

The filter (208) and the housing (202) are both substantially cylindrical.

The cap comprises a first plurality of concentric rings (238) protruding from a side (240) of the cap (228) that faces away from the filter chamber (220). The lid (224) comprises a second plurality of concentric rings (242) protruding from a side (244) of the lid (224) that faces the filter chamber (220). The first plurality of concentric rings (238) are interspersed between the second plurality of concentric rings (242), thereby forming a labyrinth seal (236). Any liquid that leaks out of the filter chamber (220) via the aperture (230) during rotation of the filter (208) has to follow a tortuous path formed by the interposed first plurality of concentric rings (238) and second plurality of concentric rings (242) and, as such, is unable in practice to pass through the labyrinth seal. In this way, contamination of the liquid that has passed through the filter (208) is avoided. A flange (290) extends from the first end (210) of the filter (208) towards the housing (202). The flange prevents feed that has been able to leave the filter chamber (220) via the aperture (230) in the cap (228) and the labyrinth seal (236) from passing from the first end (212) of the housing (202) towards the second end (216) of the housing, thus providing a further protection against contamination of the liquid that has been filtered.

When the filter (208) stops rotating, the path of least resistance for any return flow into the filter chamber (220) of liquid that has passed through the perforations in the filter (208) is back through the perforations (222) in the side wall (218) of the filter (208). Some of the return flow of liquid that has re-entered the filter chamber (220) may exit the filter chamber (220) via the inlet (226).

The centrifugal filter unit (200) has a removable portion (260) that comprises the cap (228) and a plunger comprising a shaft (266) and a plate (268). Following the carrying out of a filtration operation using the centrifugal filter unit (200), the lid (224) is removed from the housing (202), thereby revealing the cap (228). The removable portion (260) is removed by pulling the cap (228) out of the first end (210) of the housing, thus taking with it any solid material (not shown) collected in the filter chamber (220).

The cap (228) comprises six air-release mechanisms (246), two of which are shown in FIG. 2. Each air-release mechanism (246) comprises a channel (248) that has a "U-bend" shape. As such, the channel (248) has a first end (250) on the side of the cap (228) facing the filter chamber (220) and a second end (252) on the side of the cap (228) facing the lid (224). A mid-point (254) of the channel (248) is positioned at a distance closer to the axis of rotation of the filter (208) than the distance from the axis of rotation of the filter of the first end (250) and the second end (252). Air in can be released from the filter chamber (120) through the channel (148) (arrows C and D). The positions of the first end (250) and the second end (252) are shown in FIG. 2 at the same distance from the axis of rotation of the filter (208). However, the position of the first end (250) and the second end (252) can be varied in order to create an in-flow or out-flow though the labyrinth. Preferably, the second end (252) is closer to the axis of rotation than the first end (250) as this provides an in-flow which helps keep the labyrinth seal clean and free of contaminant solid material.

Figure 3:
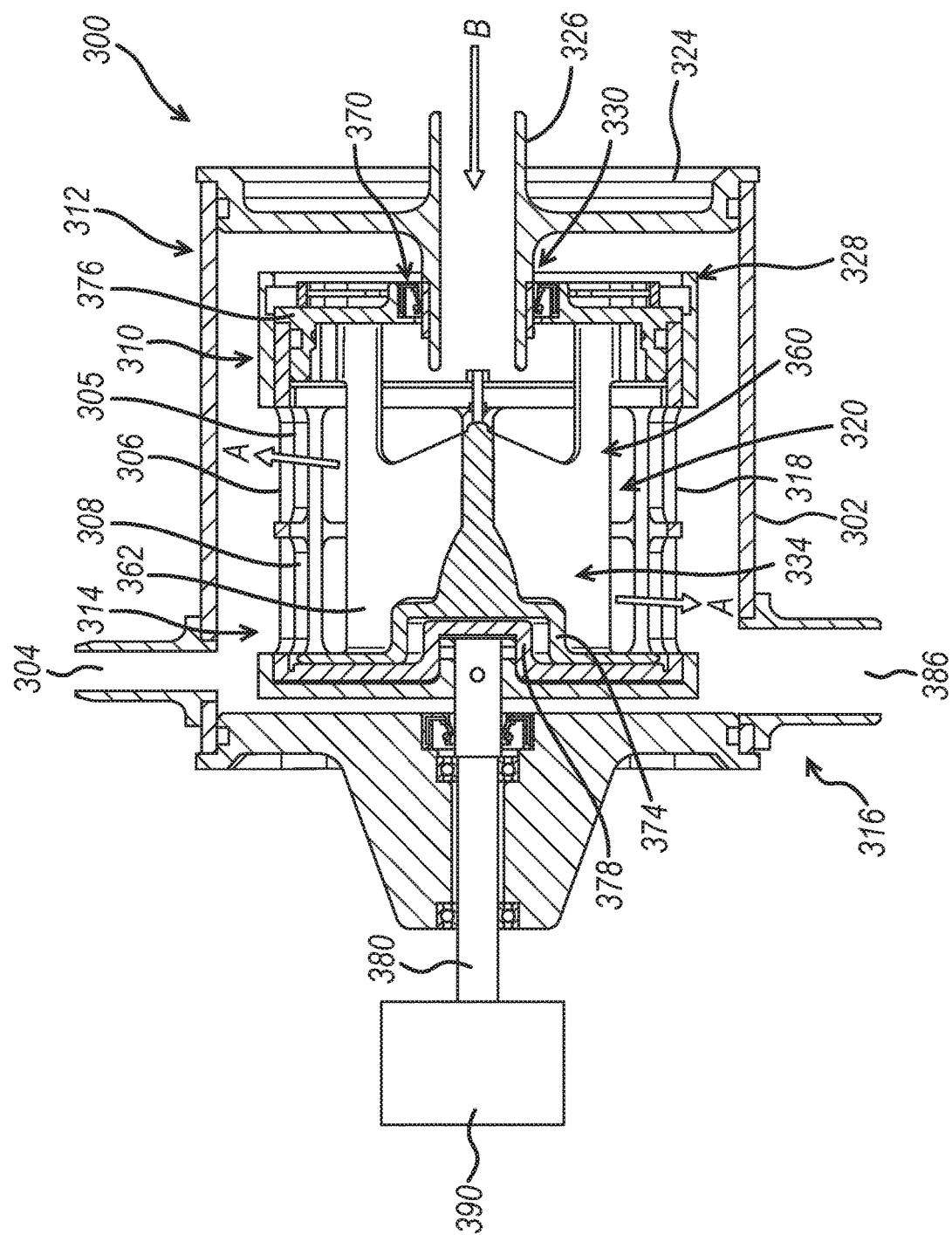
FIG. 3 shows a cross-section view of a further centrifugal filter unit according to the disclosure.

FIG. 3 illustrates a further centrifugal filter unit (300) according to the present disclosure. The centrifugal filter unit (300) has a housing (302) which has an outlet (304) through which filtered treatment formulation is able to leave the centrifugal filter unit (300). The centrifugal filter unit (300) comprises a filter (308) rotatably mounted in the housing (302). The filter comprises an inner cage (305) nested within an outer cage (306) providing structural support. The inner cage (305) of the filter (308) comprises filter material having perforations (not shown). The filter (308) has a first end (310) proximate a first end (312) of the housing (302). The filter has a second end (314) proximate the second end (316) of the housing (302). The filter has a side wall (318) between the first end (310) and the second end (314). The centrifugal filter unit (300) has a filter chamber (320). A cap (328) is located at the first end (310) of the filter (308). The cap (328) has an aperture (330) through which there is positioned an inlet (326) formed in a lid (324) but otherwise the cap (328) substantially seals the first end (310) of the filter (308) such that solid material and liquid are substantially prevented from leaving the filter chamber (320) through the first end (310) of the filter (308). The cap (328) comprises a seal (370) surrounding inlet (326). The lid (324) substantially seals the first end (312) of the housing (302). Feed (shown by arrow B) is able to enter the filter chamber (320) through the inlet (326).

The centrifugal filter unit (300) comprises a drive means (390) for rotating the filter (308). The drive means has a drive shaft (380) which engages the filter (308). An impeller (334) is coupled to the filter (308) and rotates with the filter (308). The impeller (334) has a recess (374) that engages a protrusion (378) of the filter (308). The impeller (334) is fixedly attached to the cap (328). The impeller (334) has six blades (362). The blades (362) of the impeller (334) are located proximate the second end (314) of the filter (308) in order reduce interference with the flow of feed (arrow B) entering through the inlet (326). The cap (328) rotates with the filter (308). The lid (324) does not rotate.

The filter (308) and the housing (302) are both substantially cylindrical. The housing (302) has a second outlet (386) that is connected to a valve (not shown) and which can be used to release (or "bleed") air from the centrifugal filter unit (300).

The centrifugal filter unit (300) has a removable portion (360) that comprises the cap (328) and the impeller (334). Following the carrying out of a filtration operation using the centrifugal filter unit (300), the lid (324) is removed from the housing (302), thereby revealing the cap (328). By pulling the cap (328) out of the first end (310) of the housing, the inner cage (305) of the filter (308) and the removable portion are removed from the housing (302). Once in a suitable position to empty the solid material into, for example, a waste container, the cap (328) can be separated from the inner cage (305) by a twist-lock manoeuvre. By pulling on the cap (328), the removable portion (360) is removed. Thus, the cap (328) takes with it the impeller (334) and the collected solid material (not shown) out of the filter chamber (320) allowing for disposal of the solid material. The outer cage (306) of the filter (308) is fixedly attached to the drive shaft (380) and is not routinely removable from the housing (302).

Rotation of the filter (308) and the impeller (334) has a pumping effect that causes the feed (arrow B) to be drawn in to the filter chamber (320) via the axial inlet (326), The rotation of the filter (308) and the impeller (334) causes the feed to travel in a radial direction (shown by arrows A) towards the filter side wall (318). Solid material in the feed is retained within the filter chamber (320) at the side wall (318) of the filter whereas liquid passes through the filter (308) and leaves the centrifugal filter unit (300) via the radial outlet (304) in the housing (302).

Figure 4:
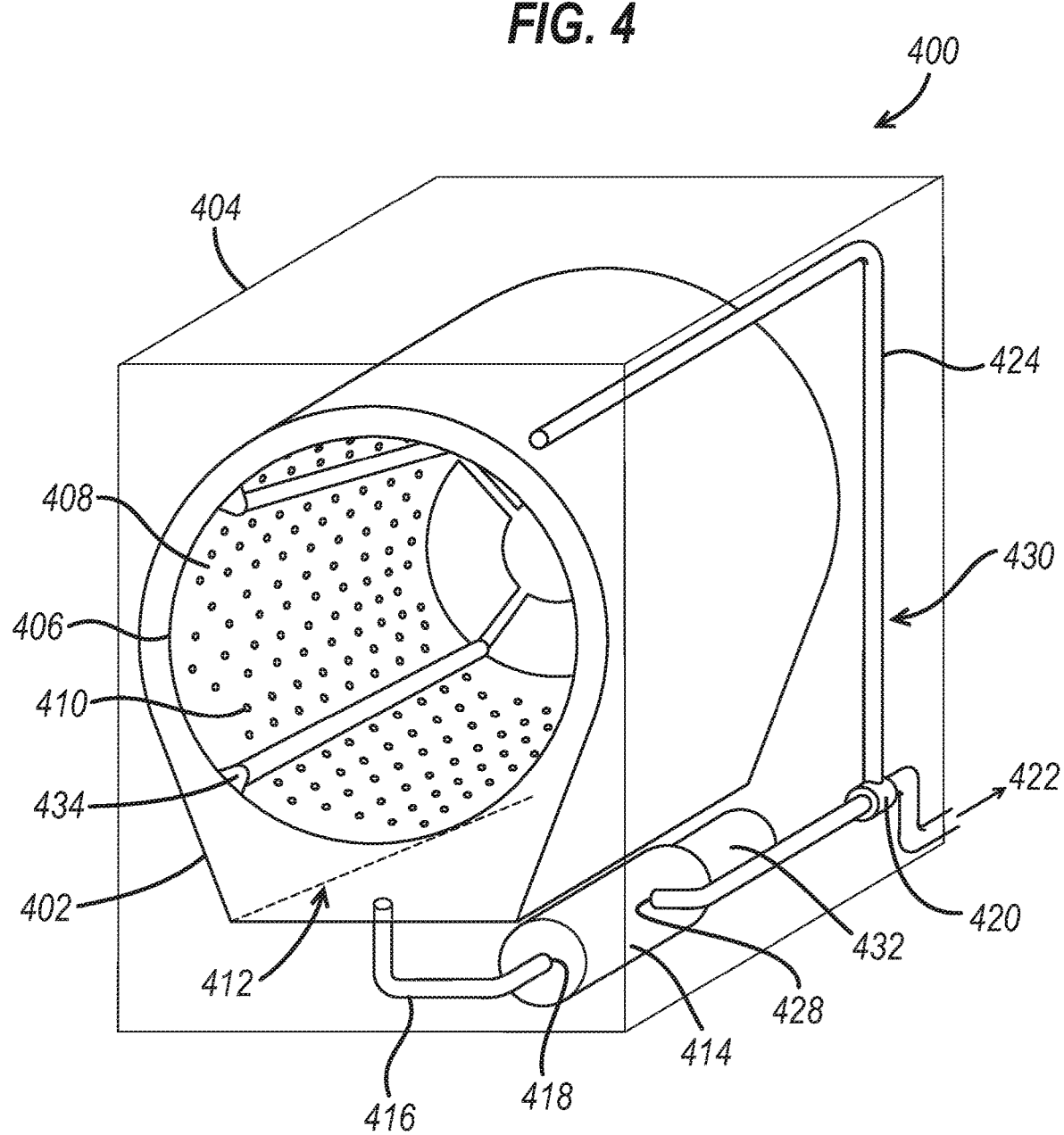
FIG. 4 shows a perspective view of an apparatus according to the disclosure.

FIG. 4 illustrates a perspective view of an apparatus (400) according to the present disclosure for treating a substrate with a treatment formulation in the presence of solid particulate material. The apparatus (400) has a tub (402) in which is rotatably mounted a cylindrical drum (406). The drum (406) has side walls (408) having a plurality of apertures (410). The apertures (410) permit treatment formulation to exit the drum (406) but do not permit the solid particulate material (not shown) to exit the drum (406) during use. The drum (406) has in-drum storage comprising a plurality of compartments (434) located at equidistant intervals on the inner circumferential surface of said drum (406). The compartments (434) additionally function as a plurality of lifters to encourage circulation and agitation of the contents of the drum during use. The compartments (434) are configured to allow solid particulate material to enter the compartments (434) when the drum (406) is rotated in a first direction and to allow solid particulate material to exit the compartments (434) when the drum (406) is rotated in a counter direction.

The apparatus has a casing (404), which is transparent in FIG. 4 in order that components within the apparatus (404) can be illustrated.

The apparatus (400) has an access means (not shown) that is moveable between an open position wherein the at least one substrate (not shown) can be placed in the drum (406) and a closed position wherein the apparatus (400) is substantially sealed. A collector (412) is located beneath the drum (406) and is configured to collect treatment formulation that exits the drum (406). In the arrangement illustrated in FIG. 4, the collector (412) is formed in part of the tub (402).

A first flow pathway (416) connects the collector (412) and the inlet (418) of a centrifugal filter unit (414) according to the disclosure herein. The centrifugal filter unit (414) comprises a drive means (432) and an outlet (428). The apparatus (400) has a recirculation means (430) for recirculating treatment formulation from the collector (412) to the drum (406). The centrifugal filter unit (414) is comprised in the recirculation means (430). In this way, the treatment formulation is filtered by the centrifugal filter unit (414) prior to being returned to the drum (406) for continued or subsequent treatment of the substrate. The recirculation means also comprises ducting (424) and a control valve (420). The control valve (420) can be operated in order to optionally send liquid filtered by the centrifugal filter unit (414) to a drain (422).

Figure 5:
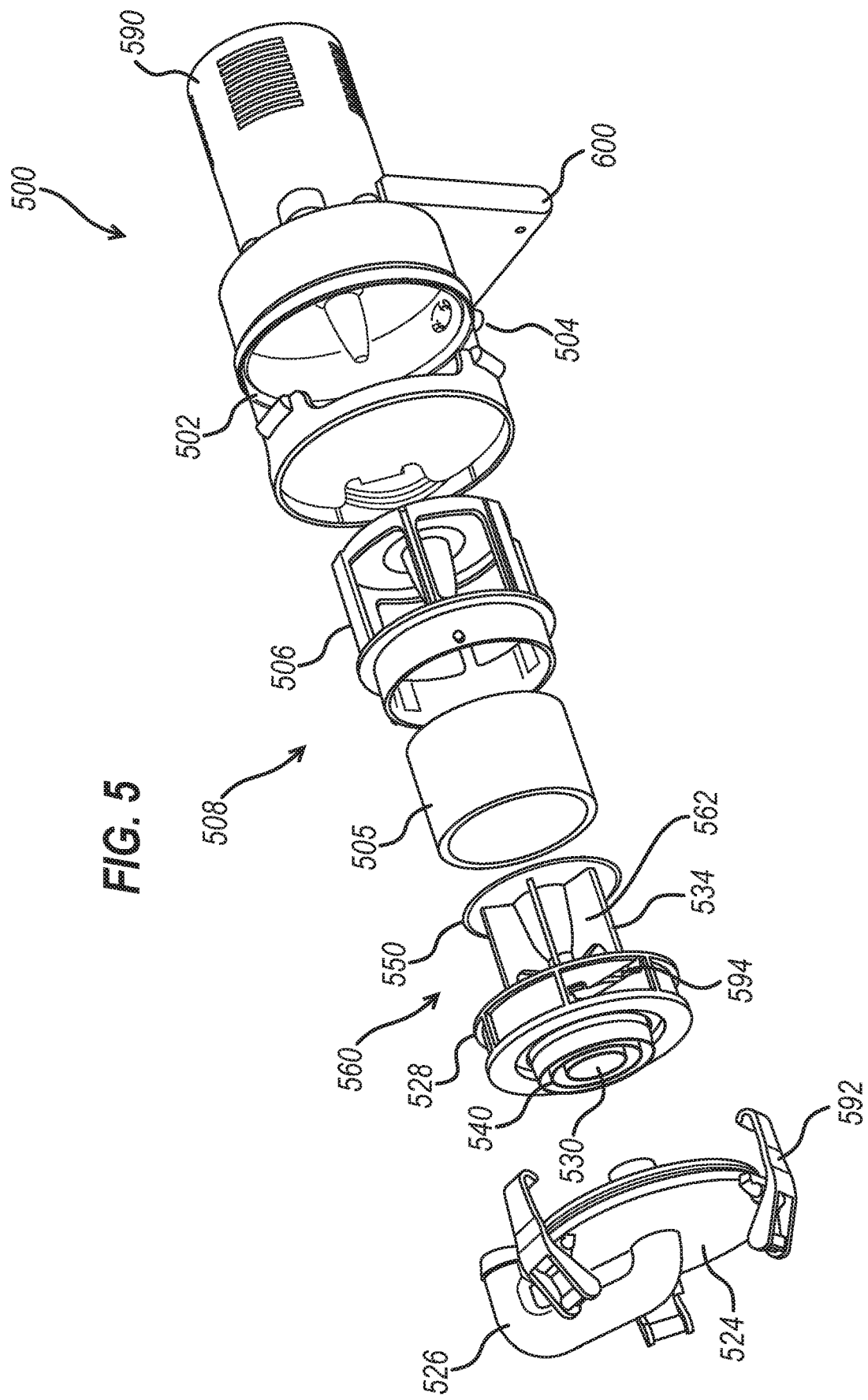
FIG. 5 shows an expanded perspective view of a further centrifugal filter unit according to the disclosure.

FIG. 5 illustrates a further centrifugal filter unit (500) according to the present disclosure and shows components of the centrifugal filter unit in partially disassembled form. The centrifugal filter unit (500) has a housing (502) which has an outlet (504) through which filtered treatment formulation is able to leave the centrifugal filter unit (500). The centrifugal filter unit (500) comprises a filter (508) which is rotatably mountable in the housing (502). The filter comprises an inner cage (505) that when assembled nests within an outer cage (506), which provides structural support. The inner cage (505) of the filter (508) comprises filter material having perforations. A cap (528) is able to substantially seal the filter (508) and can be attached to the outer cage (506) by a twist-lock mechanism (594). The cap (528) has an aperture (530) through which an inlet (526) formed in a lid (524) can fit. When assembled, the lid (524) substantially seals the housing (502). Feed is able to enter the centrifugal filter unit (500) through the inlet (526).

Attached to the cap (528) is an impeller (534). The impeller (534) and the cap (528) together form a removable portion (560). When assembled, the impeller (534) is coupled to the filter (508) and rotates with the filter (508).

The impeller (534) has six blades (562). The impeller also comprises a plate portion (550) that has an annular ring of pliable material around its edge. When the removable portion (560) is removed from the inner cage (505) of the filter (508), the plate portion (550) can draw out solid material that has been collected in the inner cage (505). As the removable portion (560) is removed from the inner cage (505), the pliable material around the edge of the plate portion (550) can scrape against the inner cage (505), thereby cleaning it.

As a result of the twist-lock mechanism (594), the cap (528) is able to rotate with the filter (508). The lid (524) does not rotate. The lid (524) can be fastened to the housing (502) using three quick-release clips (592).

The cap (528) comprises a set of concentric rings (540) which can cooperate with a set of concentric rings (not shown) in the lid (524) to form a labyrinth seal.

The filter (508) and the housing (502) are both substantially cylindrical. FIG. 5 also shows a mounting block (600), which does not form part of the centrifugal filter unit (500). The mounting block (600) is shown to exemplify one way in which the centrifugal filter unit (500) can be supported in an apparatus.

FIG. 6 illustrates a further centrifugal filter unit (700) according to the present disclosure and FIG. 7 shows the same centrifugal filter unit as a 3D cross-section. The centrifugal filter unit is configured to operate in a substantially vertical orientation. The centrifugal filter unit (700) has a housing (702) which has an outlet (704) through which filtered treatment formulation is able to leave the centrifugal filter unit (700). The centrifugal filter unit (700) comprises a filter (708) rotatably mounted in the housing (702). The filter (708) has a first end (710) proximate a first end (712) of the housing (702). The filter has a second end (714) proximate the second end (716) of the housing (702). The filter comprises an inner cage (705) that when assembled nests within an outer cage (706), which provides structural support. The inner cage (705) of the filter (708) has a side wall (718) comprising filter material having perforations (not shown). The centrifugal filter unit (700) has a filter chamber (720).

A cap (728) is located at the first end (710) of the filter (708). The cap (728) has an aperture (730) through which there is positioned an inlet (726) formed in a lid (724). There is a clearance (790) between the aperture edge and inlet (726), but otherwise the cap (728) substantially seals the first end (710) of the filter (708) such that solid material and liquid are substantially prevented from leaving the filter chamber (720) through the first end (710) of the filter (708).

The lid (724) comprises a second outlet (786) that allows air to be released from the centrifugal filter unit (700). The lid substantially seals the first end (712) of the housing (702). Feed (shown by arrow B) is able to enter the filter chamber (720) through the inlet (726).

The clearance (790) between the aperture (730) and the inlet (726) provides a path for feed to exit the first end of the filter chamber (720) when the filter becomes blocked. The lid (724) comprises an overflow collection chamber (792) which is fluidly connected to the clearance (790). Any liquid that leaks out of the filter chamber (720) via the aperture (730) during rotation of the filter (708) will pass through the clearance (790) and into the overflow collection chamber (792), without passing through the filter side wall (718). Similarly, if feed is unable to exit the filter chamber (720) through the filter wall (718), e.g. due to blockage of the filter, it can enter the overflow collection chamber (792), via the clearance (790). The overflow collection chamber (792)

prevents feed that has passed from the filter chamber (720) via the aperture (730) in the cap (728) or the clearance (790) from passing directly from the first end (712) of the housing (702) towards the second end (716) of the housing. An overflow outlet (796) is positioned within the overflow collection chamber (792). The base of the overflow collection chamber (792) is fitted with an overflow sensor (794) which detects fluid flowing via, flowing into, or collecting in the overflow collection chamber (792). In this way, the user can be alerted to blockage of the filter (708) or the need to clean or change the filter (708).

The centrifugal filter unit (700) comprises a drive means (732) for rotating the filter (708). The drive means (732) has a drive shaft (758) which engages the filter (708). An impeller (734) is coupled to the filter (708) and rotates with the filter (708). The impeller (734) has a recess (774) that engages a protrusion (778) of the filter (708). The impeller (734) is fixedly attached to the cap (728). The impeller (734) has six blades (762). The blades (762) of the impeller (734) are located proximate the second end (714) of the filter (708) in order to reduce interference with the flow of feed (arrow B) entering through the inlet (726). The cap (728) rotates with the filter (708). The lid (724) does not rotate.

The filter (708) is substantially cylindrical, and the housing (702) is conical, where the diameter of the second end (716) is greater than the diameter of the first end (712). The outlet (704) is angled tangentially and follows the outer surface of the housing (702), so as to align with the direction of flow of the filtered liquid leaving the filter chamber. The conical housing (702) assists in directing the filtered liquid to the tangential outlet (704).

The feed (arrow B) passes into or is drawn into the filter chamber (720) via the axial inlet (726). The rotation of the filter (708) and the impeller (734) causes the feed to travel in a radial direction (shown by arrow A) towards the filter side wall (718). Solid material in the feed is retained within the filter chamber (720) at the side wall (718) of the filter whereas liquid passes through the filter (708) and leaves the centrifugal filter unit (700) via the tangential outlet (704) in the housing (702). If the filter (708) becomes blocked, feed will eventually overflow and pass into the overflow collection chamber (792). The overflow sensor (794) detects fluid which flows via, into or collects in the overflow collection chamber (792) and the user is alerted and the removable portion (760), shown in FIG. 8*b*, can be removed to allow disposal of the solid material and unblocking of the filter.

As illustrated in FIG. 8, the centrifugal filter unit (700) has a removable portion (760) that comprises the cap (728) and the impeller (734). Following the carrying out of a filtration operation using the centrifugal filter unit (700), the lid (724) is removed from the housing (702), thereby revealing the cap (728). By pulling the cap (728) out of the first end (710) of the housing, the removable portion (760) and filter (708) are removed from the housing (702), as illustrated in FIG. 8*a*. Once in a suitable position to empty the solid material into, for example, a waste container, the removable portion (760) can be separated from the filter (708) by a twist-lock manoeuvre. By pulling on the cap (728), the impeller (734) is also removed from the filter (708), shown in FIG. 8*b*. Thus, the cap (728) takes with it the impeller (734) and solid collected material (not shown) from the filter chamber. The remaining portion includes the filter chamber (720), including inner and outer cages (705, 706). Thus the solid material can easily be disposed of. FIG. 8*d* shows the housing (702) after removal of the removable portion (760) and filter (708) from the housing.

EXAMPLE

Microparticulate (also known as "lint") was collected from a washing machine following washing cycles in which mixed cotton/polyester substrates had been washed. 6 g of the microparticulate was placed in a vessel and 20 L of water was added. The resulting mixture in the vessel was a visibly cloudy 'dirty' water mixture.

A centrifugal filter unit was connected in a circuit with the vessel by connecting a first pipe from the vessel to the inlet of the centrifugal filter unit and a second pipe from the outlet of the centrifugal filter unit back to the vessel. The centrifugal filter unit was of the type illustrated in FIG. 5 but in assembled form. The centrifugal filter unit had a filter diameter of 75 mm and the filter comprised a 32 µm mesh.

The centrifugal filter unit was operated for a period of 5 minutes, with the filter being rotated at a speed of 1100 rpm. This duration of operation enabled multiple passes of the water through the centrifugal filter unit, with the flow rate measured at 12.6 L per minute. After 5 minutes, the water in the vessel was visibly clear, with no visible cloudiness remaining, indicating a significant reduction in the amount of solid material remaining in the water.

Next, the water supply to the inlet of the centrifugal filter unit was closed using a valve so that no new feed was allowed to enter the centrifugal filter unit. The solid material collected in the centrifugal filter unit was dewatered by operating the centrifugal filter unit at a filter rotation speed of 1400 rpm. Dewatered solid material was retained in the filter chamber. The solid material was readily removed from the centrifugal filter unit by unclipping the lid of the centrifugal filter unit and pulling out the cap and inner cage of the filter. A removable portion (the cap and impeller) was then separated from the inner cage of the filter by undoing a twist-lock mechanism. On pulling the cap, the removable portion was drawn out of the filter, taking with it the collected solid material and, thus, readily removing the solid material from the filter chamber.

As used herein, the term "comprising" encompasses "including" as well as "consisting" and "consisting essentially of" e.g. a composition "comprising" X may consist exclusively of X or may include something additional e.g. X+Y.

As used herein, the words "a" or "an" are not limited to the singular but are understood to include a plurality, unless the context requires otherwise.

It will be appreciated that any item, feature, parameter or component described herein may, where appropriate, relate to any of the aspects of the present invention.

A non-exhaustive list of aspects of the invention is set out in the numbered clauses:

1. A centrifugal filter unit for an apparatus, wherein the apparatus is for use in the treatment of a substrate with a treatment formulation, the centrifugal filter unit comprising;
   a) a housing having an outlet configured to allow a filtrate to exit the centrifugal filter unit;
   b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
   c) a lid configured to substantially seal the first end of the housing;

d) an inlet configured to allow a feed to enter the filter chamber;
e) a cap at the first end of the filter, wherein the cap comprises an aperture that cooperates with the inlet to allow the feed to enter the filter chamber;
f) a drive means for rotating the filter; and
g) an impeller, wherein the impeller is comprised in the filter chamber;
wherein the centrifugal filter unit is configured such that when the impeller rotates, the feed is drawn in to the filter chamber through the inlet and liquid is expelled through the perforations.

2. The centrifugal filter unit of clause 1, wherein the impeller is coupled to the filter such that the impeller rotates at the same speed as the filter.

3. The centrifugal filter unit according to clause 1 or clause 2 wherein the lid is openable.

4. A centrifugal filter unit for an apparatus, wherein the apparatus is for use in the treatment of a substrate with a treatment formulation, the centrifugal filter unit comprising;
a) a housing having an outlet configured to allow a filtrate to exit the centrifugal filter unit;
b) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations configured to allow liquid to pass through but to prevent solid material from passing through;
c) a lid configured to substantially seal the first end of the housing, wherein the lid is openable;
d) an inlet configured to allow a feed to enter the filter chamber;
e) a cap at the first end of the filter, wherein the cap comprises an aperture that cooperates with the inlet to allow the feed to enter the filter chamber;
f) a drive means for rotating the filter; and
g) a removable portion configured to be positioned in the filter chamber during operation of the centrifugal filter unit and which when removed from the filter chamber following operation of the centrifugal filter unit takes with it at least a portion of the solid material prevented from passing through the perforations.

5. The centrifugal filter unit according to clause 4, wherein the removable portion is configured to rotate with the filter.

6. The centrifugal filter unit according to clause 4 or clause 5, wherein the removable portion comprises a plunger.

7. The centrifugal filter unit according to any of clauses 4 to 6, wherein the removable portion has substantially the same shape as a cross-section of the filter chamber taken through the side wall of the filter.

8. The centrifugal filter unit according to any of clauses 4 to 7, wherein the removable portion is shaped to scrape against the side wall during removal of the removable portion from the filter chamber.

9. The centrifugal filter unit according to any of clauses 4 to 8, wherein the removable portion comprises a plurality of bristles, wherein the bristles are arranged on the removable portion proximate the side wall of the filter.

10. The centrifugal filter unit according to any of clauses 4 to 9, wherein the removable portion comprises the cap.

11. The centrifugal filter unit according to any of clauses 4 to 10, further comprising an impeller wherein the impeller is comprised in the filter chamber.

12. The centrifugal filter unit according to clause 11, wherein the impeller is coupled to the filter such that the impeller rotates at the same speed as the filter.

13. The centrifugal filter unit according to clause 11 or clause 12, wherein the centrifugal filter unit is configured such that when the impeller rotates, the feed is drawn in to the filter chamber through the inlet and liquid is expelled through the perforations.

14. The centrifugal filter unit according to any of clauses 11 to 13, wherein the removable portion comprises the impeller.

15. The centrifugal filter unit according to clause 14, wherein the removable portion comprises the impeller and the cap 16. The centrifugal filter unit according to any of clauses 4 to 15, wherein the removable portion is detachable from the filter by a twist-lock mechanism.

17. The centrifugal filter unit according to any of the preceding clauses, wherein the housing and the filter are cylindrical.

18. The centrifugal filter unit according to any of the preceding clauses, wherein the filter is removable from the housing.

19. The centrifugal filter unit according to any of the preceding clauses, further comprising a controller for the drive means, wherein the controller is programmed to cause the drive means to rotate the filter at a first speed for filtering solid material from the feed and at a second speed for dewatering the filtered solid material.

20. The centrifugal filter unit according to any of the preceding clauses, wherein the cap is configured to rotate with the filter.

21. The centrifugal filter unit according to any of the preceding clauses, wherein the cap forms a labyrinth seal with the lid.

22. The centrifugal filter unit according to clause 21, wherein the cap comprises a first plurality of concentric rings on a side of the cap that faces away from the filter chamber and the lid comprises a second plurality of concentric rings on a side of the lid that faces towards the filter chamber, wherein the first plurality of concentric rings are interspersed in relation to second plurality of concentric rings to form the labyrinth seal.

23. The centrifugal filter unit according to any of the preceding clauses, further comprising an air-release mechanism.

24. The centrifugal filter unit according to clause 23, wherein the air-release mechanism is comprised in the cap.

25. The centrifugal filter unit according to clause 24, wherein the air-release mechanism comprises a channel having a first end, a second end and a mid-point, wherein the first end of the channel is positioned on a side of the cap that faces the filter chamber and the second end of the channel is positioned on a side of the cap faces away from the filter chamber, wherein the mid-point of the channel is positioned a distance from an axis of rotation of the filter that is closer than the distance from the axis of rotation of the filter at which the first end and the second end of the channel are positioned.

26. The centrifugal filter unit according to clause 25, wherein the channel has a u-bend shape.

27. The centrifugal filter unit according to any of clauses 1 to 19, wherein the cap is comprised in the lid.

28. The centrifugal filter unit according to any of the preceding clauses, further comprising an attachment means to secure the lid to the housing.

29. The centrifugal filter unit according to any of the preceding clauses, wherein the lid comprises the inlet.

30. The centrifugal filter unit according to any of the preceding clauses, wherein at least a portion of the housing is transparent.

31. The centrifugal filter unit according to any of the preceding clauses, wherein the apparatus is a textile treatment apparatus.

32. The centrifugal filter unit according to any of the preceding clauses, wherein the apparatus is a washing machine.

33. An apparatus for treating a substrate with a treatment formulation, said apparatus comprising:
 a) a tub in which a drum is rotatably mounted, said drum having side walls and said side walls comprising one or more apertures configured to permit said treatment formulation to exit the drum;
 b) an access means moveable between an open position wherein the at least one substrate can be placed in the drum and a closed position wherein the apparatus is substantially sealed;
 c) a collector, wherein said collector is located beneath said drum and is configured to collect said treatment formulation that exits the drum;
 d) a centrifugal filter unit as defined in any of clauses 1 to 32; and
 e) a first flow pathway between the collector and the inlet of the centrifugal filter unit.

34. The apparatus of clause 33, wherein the outlet of the centrifugal filter unit is fluidly connected to the drum.

35. The apparatus of clause 33, wherein the outlet of the centrifugal filter unit is fluidly connected to a drain.

36. The apparatus of clause 33, further comprising a control valve configured such that filtrate that exits the outlet of the centrifugal filter unit is selectively recirculated to the drum or sent to a drain.

37. The apparatus of clause 33 or clause 34, further comprising a recirculation means for recirculating said treatment formulation from said collector to said drum, wherein the centrifugal filter unit is comprised in the recirculation means.

38. The apparatus of any of clauses 33 to 37, wherein the apparatus is configured such that the treating of the substrate with the treatment formulation is able to occur in the presence of solid particulate material.

39. The apparatus of clause 33, wherein the solid particulate material is unable to exit the drum through the apertures.

40. The apparatus according to any of clauses 33 to 39, wherein the apparatus is a textile treatment apparatus.

41. The apparatus according to any of clauses 33 to 40, wherein the apparatus is a washing machine.

42. A method of filtering treatment formulation in an apparatus according to any of clauses 33 to 41, comprising operating the drive means to rotate the filter of the centrifugal filter unit at a first speed and transferring treatment formulation from the collector to the inlet of the centrifugal filter unit, wherein at least a portion of liquid from the treatment formulation passes through the filter and at least a portion of solid material from the treatment formulation is prevented from passing through the filter.

43. The method of clause 42 wherein the centrifugal filter unit comprises an impeller in the filter chamber and wherein the transferring of treatment formulation from the collector to the inlet of the centrifugal filter unit is effected by the impeller.

44. The method of clause 42 or clause 43, further comprising the step of transferring to the drum the filtrate that exits the outlet of the housing of the centrifugal filter unit.

45. The method of clause 42 or clause 43, further comprising the step of transferring to a drain the filtrate that exits the outlet of the housing of the centrifugal filter unit.

46. The method of any of clauses 42 to 45, further comprising a step of operating the drive means to increase the speed of rotation of the filter from the first speed to a second speed that is higher than the first speed in order to dewater the solid material collected in the filter chamber.

47. The method of any of clauses 42 to 46, further comprising the step of opening the lid of the centrifugal filter unit and extracting solid material collected in the filter chamber.

48. A method of treating a substrate comprising treating the substrate with a treatment formulation using the apparatus of any of clauses 33 to 41.

49. The method of clause 48 comprising the steps of:
 a) loading the at least one substrate into the drum and closing the access means;
 b) introducing treatment formulation to the drum;
 c) rotating the drum;
 d) collecting in the collector treatment formulation that exits the drum; and
 e) operating pumping means to pump the treatment formulation from the collector to the centrifugal filter unit and to pump the filtrate from the centrifugal filter unit back to the drum or to a drain.

50. The method of clause 49 wherein the pumping means comprises an impeller in the filter chamber of the centrifugal filter unit.

The invention claimed is:

1. A centrifugal filter unit for an apparatus, wherein the apparatus is for use in the treatment of a substrate with a treatment formulation, the centrifugal filter unit comprising;
 a) a housing having an outlet that allows a filtrate to exit the centrifugal filter unit;
 b) an inlet that allows a feed comprising a liquid and solid material to enter the centrifugal filter unit;
 c) a filter rotatably mounted in the housing, wherein the filter comprises a first end proximate a first end of the housing, a second end proximate a second end of the housing and a side wall connecting the first end of the filter and the second end of the filter, wherein the first end, second end and side wall of the filter define a filter chamber, and wherein the side wall comprises perforations that allow the liquid to pass through but to prevent the solid material from passing through;
 d) an aperture in the filter that cooperates with the inlet to allow the feed to enter the filter chamber; and
 e) a drive means for rotating the filter; wherein a portion of the centrifugal filter unit in the filter chamber is removable, and, which when removed from the centrifugal filter unit following operation takes with it at least a portion of the solid material prevented from passing through the perforations;
wherein the centrifugal filter unit is arranged such that the feed is drawn into the filter chamber from the inlet through the aperture and the liquid is expelled through the perforations to the outlet and the solid material is retained in the filter chamber, and wherein the removable portion is shaped to scrape against the side wall during removal of the removable portion from the filter chamber.

2. The centrifugal filter unit according to claim 1, further comprising a lid, wherein the lid is openable.

3. The centrifugal filter unit according to claim 1, further comprising a cap at the first end of the filter, wherein the cap comprises the aperture.

4. The centrifugal filter unit according to claim 3, wherein the removable portion comprises the cap.

5. The centrifugal filter unit according to claim 4, further comprising an impeller disposed in the filter chamber, wherein the removable portion comprises the impeller and the cap.

6. The centrifugal filter unit according to claim 1, wherein the removable portion rotates with the filter.

7. The centrifugal filter unit according to claim 1, wherein the removable portion comprises a plunger.

8. The centrifugal filter unit according to claim 1, wherein the removable portion has substantially the same shape as a cross-section of the filter chamber taken through the side wall of the filter.

9. The centrifugal filter unit according to claim 1, wherein at least a portion of the removable portion has substantially the same shape as a cross-section of the filter chamber taken through the side wall of the filter.

10. The centrifugal filter unit according to claim 1, wherein the removable portion comprises a plurality of bristles, wherein the bristles are arranged on the removable portion proximate the side wall of the filter.

11. The centrifugal filter unit according to claim 1, further comprising an impeller disposed in the filter chamber.

12. The centrifugal filter unit according to claim 11, wherein the impeller is coupled to the filter such that the impeller rotates at the same speed as the filter.

13. The centrifugal filter unit according to claim 11, wherein the removable portion comprises the impeller.

14. The centrifugal filter unit according to claim 1, wherein the removable portion is detachable from the filter by a twist-lock mechanism.

15. The centrifugal filter unit according to claim 1, wherein the perforations in the filter have an average largest dimension of no more than 70 µm.

* * * * *